United States Patent [19]
Yokota et al.

[11] Patent Number: 4,986,642
[45] Date of Patent: Jan. 22, 1991

[54] OBJECTIVE LENS SYSTEM FOR ENDOSCOPES AND IMAGE PICKUP SYSTEM EQUIPPED WITH SAID OBJECTIVE LENS SYSTEM

[75] Inventors: Akira Yokota, Kanagawa; Hiroyuki Fukuda; Susumu Takahashi, both of Tokyo, all of Japan

[73] Assignee: Olympus Optical Co., Ltd., Tokyo, Japan

[21] Appl. No.: 272,991

[22] Filed: Nov. 18, 1988

[30] Foreign Application Priority Data

Nov. 20, 1987 [JP] Japan .................................. 62-291801
Feb. 5, 1988 [JP] Japan .................................. 63-023963
Apr. 22, 1988 [JP] Japan .................................. 63-098164

[51] Int. Cl.$^5$ ............................................. G02B 13/18
[52] U.S. Cl. .................................... 350/432; 350/439; 350/445
[58] Field of Search ..................... 350/439, 445, 432

[56] References Cited

U.S. PATENT DOCUMENTS 4,598,980 7/1986 Doi et al. .
4,662,725 5/1987 Nisioka .
4,674,844 6/1987 Nishioka et al. .
4,720,178 1/1988 Nishioka et al. .

Primary Examiner—Bruce Y. Arnold
Assistant Examiner—Rebecca D. Gass
Attorney, Agent, or Firm—Cushman, Darby & Cushman

[57] ABSTRACT

An image pickup system using an objective lens system for endoscopes consisting of an objective lens system comprising a front lens unit having negative refractive power and a rear lens unit having positive refractive power, and an optical system comprising an image sensor, and so adapted as to permit disposing the image sensor obliquely or parallel relatively to the optical axis by prolonging back focal length of said objective lens system and arranging an optical path deflecting system between said objective lens system and said image sensor.

51 Claims, 22 Drawing Sheets

OBJECTIVE LENS SYSTEM FOR ENDOSCOPES AND IMAGE PICKUP SYSTEM EQUIPPED WITH SAID OBJECTIVE LENS SYSTEM

BACKGROUND OF THE INVENTION (a) Field of the Invention

The present invention relates to an image pickup system using objective lens system having a very long back focal length for endoscopes.

(b) Description of the Prior Art

In the recent years, it is practised to use video endoscope equipped with solid-state image sensors in place of image guide fiber bundles. The video endoscope of this type consists of an objective lens and a solid-state image sensor arranged which are in a distal end of an endoscope, and is so adapted as to pick up an image formed with the objective lens and convert the image into electrical signals which are to be taken out and displayed on a monitor television screen for observing interiors of coelomata, engines, tubular bodies and other locations that are usually hardly observable.

Since the solid-state image sensor is larger than the image guide fiber bundle conventionally used in endoscopes, the distal end of the endoscope is thickened in such a video endoscope when the solid-state image sensor is arranged in such a direction as to set the light receiving surface thereof is perpendicular to the longitudinal axis of the endoscope.

For this reason, it is practised to arrange the solid-state image sensor parallelly or obliquely relative to the longitudinal axis of the endoscope so that the solid-state image sensor occupies a minimum space in the diametrical direction and diameter of the distal end is not thickened. U.S. Pat. No. 4,720,178 discloses a conventional example of such an endoscope comprising a solid-state image sensor arranged as described above. In order to arrange a solid-state image sensor obliquely, it is necessary, as described in the specification of this patent, to deflect the direction of the optical path by arranging an optical path deflecting system consisting of prisms on the exit side of an objective lens. For this purpose, it is necessary to obtain an objective lens having a back focal length which is long enough to allow to arrange the optical path deflecting system.

In order to prolong a back focal length of a lens system, it is effective to select the inverted telephoto type power distribution and an objective lens system for endoscopes adopting this type power distribution is disclosed by U.S. Pat. No. 4,662,725. However, general objective lens systems have focal lengths which are not long sufficiently and are not suited for use in video endoscope.

SUMMARY OF THE INVENTION

A primary object of the present invention is to provide an objective lens system having a long back focal length and permitting to obtain sufficient brightness of the marginal area of the image, and an image pickup system using said objective lens system.

The image pickup system for endoscopes according to the present invention comprises an objective lens system, an optical path deflecting system arranged on the exit side of said objective lens system and a solid-state image sensor arranged parallelly or obliquely relative to the longitudinal axis of an endoscope for receiving the light emitted out of said optical path deflecting system as well as an optical low pass filter and an infrared light cut filter which are arranged as occasion demands. The image pickup system according to the present invention is so designed as to be arranged in the distal end of an endoscope.

Out of the component members of the image pickup system according to the present invention, the objective lens system has the most remarkable characteristic and is composed as described below.

The objective lens system according to the present invention comprises, in the order from the object side, a front lens unit having negative refractive power and a rear lens unit having positive refractive power, and is so designed as to satisfy the following condition (1):

$$|f_1/f| < 3.8 \tag{1}$$

wherein the reference symbol f represents focal length of the objective lens system as a whole and the reference symbol $f_1$ designates focal length of the front lens unit.

If the condition (1) is not satisfied or $|f_1/f|$ is larger than 3.8, it will be impossible to reserve a sufficiently long back focal length and quantity of the marginal ray will be insufficient. However, if $|f_1/f|$ is to small or smaller than 0.4, in contrast, back focal length will be too long, thereby making it impossible to design the objective lens system compact.

Then, focal length $f_2$ of the rear lens unit should desirably satisfy the following condition (2):

$$0.4 < f_2/f < 30 \tag{2}$$

If the lower limit of this condition is exceeded, back focal length of the objective lens system will be shortened. If the upper limit of the condition (2) is exceeded, in contrast, the rear lens unit will have weak refractive power, thereby prolonging total length of the objective lens system and making said lens system unsuited for use in an endoscope.

Especially when an aperture stop is arranged between the objective lens system and the visual field deflecting prisms, it is desirable that focal lengths $f_1$ and $f_2$ of the front lens unit and the rear lens unit are set within the ranges defined by the following conditions (3) and (4) respectively:

$$-1.2 < f_1/f < -0.5 \tag{3}$$

$$1.5 < f_2/f < 2.5 \tag{4}$$

If $f_1/f$ is smaller than the lower limit of the condition (3) or if $f_2/f$ is smaller than the lower limit of the condition (4), field angle of the objective lens system will be narrowed, Petzval's sum of the lens system as a whole will be overcorrected, back focal length of the objective lens system as a whole will be shortened and the quantity of the marginal ray will be insufficient. If $f_1/f$ is larger than the upper limit of the condition (3) or if $f_2/f$ exceeds the upper limit of the condition (4), in contrast, field angle of the objective lens system will be too wide, Petzval's sum of the objective lens system as a whole will be undercorrected and back focal length of the objective lens system as a whole will be too long, thereby making it impossible to design the objective lens system compact.

For the objective lens system for endoscopes according to the present invention which is so designed as to satisfy the above-mentioned conditions, back focal length $f_B$ is set within the range defined by the following condition (5):

$$|f_B/f| > 1.4 \quad (5)$$

In the image pickup system for endoscopes according to the present invention, it is necessary to arrange an optical path deflecting system consisting of prisms after the objective lens system for allowing an image sensor to be arranged parallelly or obliquely relative to the optical axis. For this purpose, it is necessary to reserve a sufficiently long distance from the objective lens system to the image point thereof.

Further, since a solid-state image sensor exhibits sensitivity to infrared light, it is necessary to use an infrared light cut filter for cutting off the infrared light.

Furthermore, when a coloring system using a mosaic filter array is to be adopted as a solid-state image sensor, it is necessary to use an optical low pass filter to prevent the moiré from being produced.

In addition, an image sensor protective cover glass plate is required for preventing dust from adhering to the image sensor.

For the reasons described above, it is necessary to arrange prisms, an infrared light cut filter, an optical low pass filter and an image sensor protective cover glass plate between the objective lens system and the image sensor, and a sufficiently long distance must be reserved from the objective lens system to the image point thereof (image distance).

This image distance is variable depending on the distance from the objective lens system to the position of an object observed therethrough (object distance). In order to obtain a value of this image distance which allows the optical elements such as said prisms and filters to be arranged regardless of the object distance, it is necessary to design the objective lens system so as to satisfy the above-mentioned condition (5). That is to say, the condition (5) defines back focal length $f_B$ of the objective lens system which is the image distance corresponding to infinite object distance.

If the condition (5) is not satisfied, the back focal length $f_B$ and the image distance of the objective lens system are shortened, thereby making it difficult to arrange the prisms, filter and so on.

Further, when the objective lens system has an aperture stop on the image side thereof, it is necessary to further prolong the back focal length $f_B$ and the following condition (6) must be satisfied:

$$|f_B/f| > 3 \quad (6)$$

If this condition is not satisfied, it will be impossible to adopt an optical path deflecting system in which light is reflected four times as shown in FIG. 1 or more times.

Furthermore, when an optical path deflecting system in which light is reflected four times by a first triangular prism 5a and a second triangular prism 5b as shown in FIG. 2 is used in combination with the objective lens system having an aperture stop arranged thereafter, the following relations are established:

$$x = 90° - 2\alpha$$

$$y = \phi - (90° - \gamma) = \phi + \gamma - 90°$$

$$z = \beta + (\beta + x) = y + \gamma$$

wherein the reference symbols $\alpha$, $\beta$ and $\gamma$ represent angles of the first triangular prism 5a and the second triangular prism 5b, the reference symbols x, y and z designate angles formed between the optical axes of the light passing through these prisms and the surfaces of the prisms respectively, and the reference symbol $\phi$ denotes the angle formed between the incident light and emerging light on and from the optical path deflecting system.

From the relations mentioned above, we obtain the following relation:

$$\beta + \beta + (90° - 2\alpha) = (\phi + \gamma - 90°) + \gamma$$

This relation can be transformed as follows:

$$\alpha - \beta + \gamma = 90° - \phi/2$$

In order to design the prisms compact, it is necessary to select $\phi \approx 90°$ and $\gamma \approx 45°$ which are advantageous from the viewpoints of shapes and dimensions of the prisms, and allow to reserve a light pencil incident on the second triangular prism 5b. It is therefore preferable to select a $\alpha \approx \beta$.

Assuming that both the prisms have a refractive index n, $\alpha$ must be smaller than $$\sin^{-1}\frac{1}{n}$$

for allowing light to be reflected totally on the bottom surface of the second triangular prism 5b. Further, since it is necessary to reserve a distance longer than a certain definite length between the image sensor and the first triangular prism 5a, the following condition must be satisfied:

$$l > 2h + 2I$$

wherein the reference symbol l represents length of the bottom surface of the second triangular prism, the reference symbol h designates height of the principal ray incident on the first triangular prism and the reference symbol I denotes height of image.

From the relations described above, we obtain $\alpha \approx \beta \approx 30°$.

FIG. 3A illustrates a development diagram of the optical path deflecting system shown in FIG. 2. As seen from this diagram, the first triangular prism 5a has an optical path length longer than 2h/n and the second triangular prism 5b has an optical path length longer than (h tan $2\beta$ + I tan $2\alpha$)/n.

Accordingly, we obtain the following relation:

$$SK > D_1 + (2h + h\tan 2\beta + I\tan 2\alpha)/n + D_2 \approx$$

$$D_1 + \{2h + (h + I)\tan 2\alpha\}/n + D_2 \approx$$

$$D_1 + \{2h + \sqrt{3}\,(h + I)\}/n + D_2$$

wherein the reference symbol SK represents the distance from the final lens surface to the image plane determined based on the paraxial theory, the reference symbol $D_1$ designates the distance from the final lens surface to the first triangular prism and the reference symbol $D_2$ denotes the distance from the second triangular prism to the imaging plane.

In these relations, the height of ray h is almost determined by brightness of an objective lens system, whereas $D_1$, $D_2$ and I are almost determined by size, etc. of an image sensor. These factors have the following values in embodiments of the objective lens system according to the present invention:

$D_1 = 0.8$, $D_2 = 0.3$, $h \approx 0.5$, $I \approx 1$, $n = 1.8061$

By using these values in the above-mentioned formulae, a condition for SK is determined as follows:

$SK > 3f$

If SK is equal to or larger than 3f, it will be impossible to arrange the optical path deflecting system 5 shown in FIG. 1 or an optical path deflecting system having an optical path longer than that of said optical path deflecting system after the objective lens system. In addition, the light pencil will be incident at a large angle on the marginal portion of an image and quantity of the marginal ray will undesirably be insufficient.

When the surface arranged on the extreme image side in the objective lens system is concave on the image side, however, the marginal portion of the lens is located on the image side of the central portion thereof located on the optical axis and such as optical path deflecting system may not be arranged even in case of $SK > 3f$. In order to eliminate this defect, it is desirable to select $f_B > 3f$.

Further, in order to obtain sufficient brightness of the marginal area of the image, it is desirable to satisfy the following condition (7):

$$5° \leq \tan^{-1}\frac{I}{SK - EX} \leq 35° \quad (7)$$

wherein the reference symbol EX represents distance as measured from the final lens surface of the objective lens system to the exit pupil thereof.

If the lower limit of the condition (7) is exceeded, the optical path deflecting system will be extremely long and large. If the upper limit of the condition (7) is exceeded, in contrast, quantity of the marginal ray will be reduced and the optical path of the objective lens system will be shortened, thereby making it impossible to arrange the optical path deflecting system.

Furthermore, oblique arrangement of the solid-state image sensor is more advantageous than parallel arrangement thereof relative to the optical axis in the image pickup system for endoscopes according to the present invention since the former arrangement permits thinning the diameter of an endoscope and shortening the distance as measured from the tip of the objective lens system to the rear edge of the solid-state image sensor, thereby allowing to design a compacter endoscope.

When a CCD image sensor is used as in the case of the image pickup system according to the present invention, it is necessary to use an optical system as bright as possible. Therefore, it is necessary to focus a lens system having a shallow depth of focus on objects located within a range from a short distance to infinite distance. It is therefore desirable to focus the lens system by shifting some lens components arranged in the lens system.

Further, it is possible to arrange an aperture stop serving also as a flare stop before the prisms (the optical path deflecting system) in an objective lens system having aperture stop arranged thereafter. When the interval between the picture elements of the image sensor is longer in the vertical direction than in the horizontal direction, shape of this aperture stop should desirably be rectangle longer in the horizontal direction taking arrangement of the picture elements in the image sensor into consideration. This shape is required for obtaining resolution which is constant in the vertical direction of the CCD image sensor by horizontally elongating the minimum circle of confusion determined by the numerical aperture of the light pencil incident on an image.

Furthermore, as for the filters required for a video endoscope, lenses may be made of crystal for eliminating the moiré or an infrared light cut filter for allowing use of laser may be arranged in the image pickup system according to the present invention. Moreover, it is desirable to arrange an ND filter for optically controlling brightness before the objective lens system for endoscopes. In addition, a color temperature conversion filter for correcting color temperature of illumination light may be arranged before the objective lens system for endoscopes.

The light pencil is made thinner before the optical path deflecting system and the prisms can be minimized accordingly by leading the principal ray emitted from the objective lens system not in parallel to the optical axis but so as to be diverged. A₀ shown in FIG. 3A, when the angle formed between the offaxial principal ray emerging from the objective lens system and the optical axis is represented by $\theta_2$, and the angle formed between the offaxial principal ray and the offaxial ray having passed through the marginal portion of the stop, i.e., half of the converging angle of the offaxial light pencil incident on the image sensor is represented by $\theta_2$, it is desirable to satisfy the following condition (8):

$$|\theta_1| > |\theta_2/3| \quad (8)$$

If this condition (8) is not satisfied, it will be impossible to minimize the light pencil sufficiently, thereby obliging to enlarge the prisms and making it impossible to obtain the effect of the oblique arrangement of the image sensor.

DETAILED DESCRIPTION OF THE PREFERRED EMBODIMENTS

Figure 1:
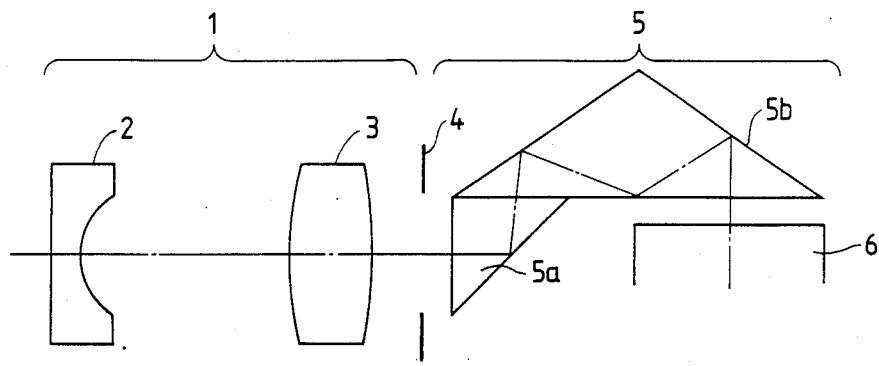
FIG. 1 shows a sectional view illustrating the objective lens system for endoscopes according to the present invention wherein the imaging plane is arranged in parallel to the optical axis.

Now, the preferred Embodiments of the objective lens system for endoscopes according to the present invention will be detailedly described with reference to the numerical data thereof.

EMBODIMENT 1

| \multicolumn{5}{c}{$f = 1$, object distance $-8$, F/3.75, IH = 0.83} |
|---|---|---|---|---|
| $r_1 = \infty$ | | | | |
| | $d_1 = 0.2061$ | $n_1 = 1.883$ | $\nu_1 = 40.76$ | |
| $r_2 = 0.7047$ | | | | |
| | $d_2 = 0.6765$ | | | |
| $r_3 = \infty$ | | | | |
| | $d_3 = 0.485$ | $n_2 = 1.53172$ | $\nu_2 = 48.90$ | |
| $r_4 = \infty$ | | | | |
| | $d_4 = 0.2619$ | | | |
| $r_5 = -6.3935$ | | | | |
| | $d_5 = 0.7177$ | $n_3 = 1.69895$ | $\nu_3 = 30.12$ | |
| $r_6 = -1.0015$ | | | | |
| | $d_6 = 0.1867$ | $n_4 = 1.51633$ | $\nu_4 = 64.15$ | |
| $r_7 = 36.3977$ | | | | |
| | $d_7 = 0.531$ | | | |
| $r_8 = -6.0306$ | | | | |
| | $d_8 = 0.3952$ | $n_5 = 1.54072$ | $\nu_5 = 47.20$ | |
| $r_9 = 1.5548$ | | | | |
| | $d_9 = 0.2990$ | | | |
| $r_{10} = 1.8974$ | | | | |
| | $d_{10} = 0.4850$ | $n_6 = 1.6180$ | $\nu_6 = 63.38$ | |
| $r_{11} = -1.6324$ | | | | |
| | $d_{11} = 0.1334$ | $n_7 = 1.84666$ | $\nu_7 = 23.88$ | |
| $r_{12} = 77.1157$ | | | | |
| | $d_{12} = 0.7995$ | | | |
| $r_{13} = \infty$ (stop) | | | | |
| | $d_{13} = 0.1212$ | $n_8 = 1.51633$ | $\nu_8 = 64.15$ | |
| $r_{14} = \infty$ | | | | |
| | $d_{14} = 1.1033$ | $n_9 = 1.8061$ | $\nu_9 = 40.95$ | |
| $r_{15} = \infty$ | | | | |
| | $d_{15} = 0.0291$ | | | |
| $r_{16} = \infty$ | | | | |
| | $d_{16} = 3.3826$ | $n_{10} = 1.8061$ | $\nu_{10} = 40.95$ | |
| $r_{17} = \infty$ | | | | |
| | $d_{17} = 0.0170$ | | | |
| $r_{18} = \infty$ | | | | |
| | $d_{18} = 0.1940$ | $n_{11} = 1.5$ | $\nu_{11} = 70$ | |
| $r_{19} = \infty$ | | | | |

$f_1 = -0.798$, $f_2 = 1.889$
SK = 3.78, $\tan^{-1}$ I/(SK-EX) = 15.58°
$n_p = n_3 = 1.69895$, $n_n = n_4 = 1.51633$
$\nu_p = \nu_3 = 30.12$, $\nu_n = \nu_4 = 64.15$

EMBODIMENT 2

| \multicolumn{5}{c}{$f = 1$, object distance $-8.38$, F/4.14, IH = 0.82} |
|---|---|---|---|---|
| $r_1 = \infty$ | | | | |
| | $d_1 = 0.1916$ | $n_1 = 1.883$ | $\nu_1 = 40.78$ | |
| $r_2 = 0.8922$ | | | | |
| | $d_2 = 0.7185$ | | | |
| $r_3 = \infty$ | | | | |
| | $d_3 = 0.4790$ | $n_2 = 1.53172$ | $\nu_2 = 48.90$ | |
| $r_4 = \infty$ | | | | |
| | $d_4 = 0.1311$ | | | |
| $r_5 = 4.2672$ | | | | |
| | $d_5 = 0.8033$ | $n_3 = 1.59270$ | $\nu_3 = 35.29$ | |
| $r_6 = -1.0861$ | | | | |
| | $d_6 = 0.1437$ | $n_4 = 1.53113$ | $\nu_4 = 62.44$ | |
| $r_7 = -1.7294$ | | | | |
| | $d_7 = 0.3832$ | | | |
| $r_8 = -2.0397$ | | | | |
| | $d_8 = 0.2277$ | $n_5 = 1.53113$ | $\nu_5 = 62.44$ | |
| $r_9 = 2.8566$ | | | | |
| | $d_9 = 0.6946$ | | | |
| $r_{10} = 2.9876$ | | | | |
| | $d_{10} = 0.4431$ | $n_6 = 1.62230$ | $\nu_6 = 53.20$ | |
| $r_{11} = -0.6606$ | | | | |
| | $d_{11} = 0.1437$ | $n_7 = 1.80518$ | $\nu_7 = 25.43$ | |
| $r_{12} = -1.2579$ | | | | |
| | $d_{12} = 0.1214$ | | | |
| $r_{13} = \infty$ (stop) | | | | |
| | $d_{13} = 0.1198$ | $n_8 = 1.51633$ | $\nu_8 = 64.15$ | |
| $r_{14} = \infty$ | | | | |
| | $d_{14} = 4.5503$ | $n_9 = 1.8061$ | $\nu_9 = 40.95$ | |
| $r_{15} = \infty$ | | | | |

$f_1 = -1.01$, $f_2 = 2.134$
SK = 3.4228, $\tan^{-1}$ I/(SK-EX) = 13.9°
$n_p = n_3 = 1.59270$, $\nu_p = \nu_3 = 35.29$
$n_n = n_4 = 1.53113$, $\nu_4 = 62.44$

EMBODIMENT 3

| \multicolumn{5}{c}{$f = 1$, object distance $-8.08$, F/4.04, IH = 0.83} |
|---|---|---|---|---|
| $r_1 = \infty$ | | | | |
| | $d_1 = 0.1944$ | $n_1 = 1.883$ | $\nu_1 = 40.78$ | |
| $r_2 = 0.6964$ | | | | |
| | $d_2 = 0.6552$ | | | |
| $r_3 = \infty$ | | | | |
| | $d_3 = 0.4860$ | $n_2 = 1.53172$ | $\nu_2 = 48.90$ | |
| $r_4 = \infty$ | | | | |
| | $d_4 = 0.3190$ | | | |
| $r_5 = -10.1955$ | | | | |
| | $d_5 = 0.8448$ | $n_3 = 1.68893$ | $\nu_3 = 31.08$ | |
| $r_6 = -1.1752$ | | | | |
| | $d_6 = 0.4423$ | $n_4 = 1.51633$ | $\nu_4 = 64.15$ | |
| $r_7 = -1.6858$ | | | | |
| | $d_7 = 0.2914$ | | | |
| $r_8 = 9.7282$ | | | | |
| | $d_8 = 1.2258$ | $n_5 = 1.618$ | $\nu_5 = 63.38$ | |
| $r_9 = -1.022$ | | | | |
| | $d_9 = 0.1065$ | $n_6 = 1.84666$ | $\nu_6 = 23.88$ | |
| $r_{10} = -2.0389$ | | | | |
| | $d_{10} = 0.2078$ | | | |
| $r_{11} = \infty$ (stop) | | | | |
| | $d_{11} = 0.1215$ | $n_7 = 1.51633$ | $\nu_7 = 64.15$ | |
| $r_{12} = \infty$ | | | | |
| | $d_{12} = 4.4957$ | $n_8 = 1.8061$ | $\nu_8 = 40.95$ | |
| $r_{13} = \infty$ | | | | |

$f_1 = -0.789$, $f_2 = 1.840$
SK = 3.43, $\tan^{-1}$ I/(SK-EX) = 14.48°
$n_p = n_3 = 1.68893$, $\nu_p = \nu_3 = 31.08$
$n_n = n_4 = 1.51633$, $\nu_n = \nu_4 = 64.15$

EMBODIMENT 4

| \multicolumn{5}{c}{$f = 1$, F/8.7, IH = 0.821, $2\omega = 78.8°$} |
|---|---|---|---|---|
| $r_1 = \infty$ | | | | |
| | $d_1 = 0.1138$ | $n_1 = 1.88300$ | $\nu_1 = 40.78$ | |
| $r_2 = 0.4116$ | | | | |
| | $d_2 = 0.1434$ | | | |
| $r_3 = 0.7405$ | | | | |
| | $d_3 = 0.3301$ | $n_2 = 1.72825$ | $\nu_2 = 28.46$ | |
| $r_4 = -0.5552$ | | | | |
| | $d_4 = 0.0911$ | $n_3 = 1.72916$ | $\nu_3 = 54.68$ | |
| $r_5 = 1.5126$ | | | | |
| | $d_5 = 0.455$ | | | |
| $r_6 = \infty$ | | | | |
| | $d_6 = 0.3415$ | $n_4 = 1.51633$ | $\nu_4 = 64.15$ | |
| $r_7 = \infty$ (stop) | | | | |
| | $d_7 = 0.455$ | | | |
| $r_8 = \infty$ | | | | |
| | $d_8 = 0.1707$ | $n_5 = 1.51633$ | $\nu_5 = 64.15$ | |
| $r_9 = -0.6941$ | | | | |
| | $d_9 = 0.1480$ | | | |
| $r_{10} = 1.4316$ | | | | |

-continued

| f = 1, F/8.7, IH = 0.821, 2ω = 78.8° | | | |
|---|---|---|---|
| $r_{11} = -0.7847$ | $d_{10} = 0.2504$ | $n_6 = 1.51633$ | $\nu_6 = 64.15$ |
| $r_{12} = -0.6779$ | $d_{11} = 0.1366$ | | |
| $r_{13} = -1.4783$ | $d_{12} = 0.0911$ | $n_7 = 1.84666$ | $\nu_7 = 23.88$ |
| $r_{14} = \infty$ | $d_{13} = 0.1480$ | | |
| $r_{15} = \infty$ | $d_{14} = 0.7967$ | $n_8 = 1.54869$ | $\nu_8 = 45.55$ |
| $r_{16} = \infty$ | $d_{15} = 1.4466$ | $n_9 = 1.68893$ | $\nu_9 = 31.08$ |
| $r_{17} = \infty$ | $d_{16} = 0.0046$ | | |
| $r_{18} = \infty$ | $d_{17} = 0.5566$ | $n_{10} = 1.68893$ | $\nu_{10} = 31.08$ |

$|\theta_1| - |\theta_2/3| = |-17.5°| - |3.28°/3| > 0$
$f_B/f = 1.76, |h_1/f_1|/|h_4/f_4| = 4.65$
$|f_1|/f = 0.466, |f_{234}|/f = 0.843$

EMBODIMENT 5

| f = 1, F/12, IH = 0.839, 2ω = 79.9° | | | |
|---|---|---|---|
| $r_1 = \infty$ | $d_1 = 0.1301$ | $n_1 = 1.88300$ | $\nu_1 = 40.78$ |
| $r_2 = 0.5568$ | $d_2 = 0.6251$ | | |
| $r_3 = 9.0785$ | $d_3 = 0.7785$ | $n_2 = 1.60342$ | $\nu_2 = 38.01$ |
| $r_4 = -1.0737$ | $d_4 = 0.1162$ | | |
| $r_5 = \infty$ | $d_5 = 0.7460$ | $n_3 = 1.51633$ | $\nu_3 = 64.15$ |
| $r_6 = \infty$ (stop) | $d_6 = 0.1162$ | | |
| $r_7 = 1.4999$ | $d_7 = 0.5461$ | $n_4 = 1.51633$ | $\nu_4 = 64.15$ |
| $r_8 = -0.9017$ | $d_8 = 0.2324$ | | |
| $r_9 = -0.6921$ | $d_9 = 0.1487$ | $n_5 = 1.84666$ | $\nu_5 = 23.78$ |
| $r_{10} = \infty$ | $d_{10} = 0.1859$ | $n_6 = 1.88300$ | $\nu_6 = 40.78$ |
| $r_{11} = -1.7704$ | $d_{11} = 0.1162$ | | |
| $r_{12} = \infty$ | $d_{12} = 0.8134$ | $n_7 = 1.54869$ | $\nu_7 = 45.55$ |
| $r_{13} = \infty$ | $d_{13} = 1.7936$ | $n_8 = 1.68893$ | $\nu_8 = 31.08$ |
| $r_{14} = \infty$ | $d_{14} = 0.0005$ | | |
| $r_{15} = \infty$ | $d_{15} = 0.2515$ | $n_9 = 1.68893$ | $\nu_9 = 31.08$ |
| $r_{16} = \infty$ | $d_{16} = 0.0004$ | | |
| $r_{17} = \infty$ | $d_{17} = 0.1162$ | $n_{10} = 0.51633$ | $\nu_{10} = 64.15$ |
| $r_{18} = \infty$ | | | |

$|\theta_1| - |\theta_2/3| = |-17.0°| - |2.4°/3| > 0$
$f_B/f = 1.74 > 1.4$
$|h_1/f_1|/|h_4/f_4| = 4.80 > 1.15$
$|f_1|/f = 0.631 < 1, |f_{234}|/f = 1.204$

EMBODIMENT 6

| f = 1, F/12, IH = 0.843, 2ω = 80.3° | | | |
|---|---|---|---|
| $r_1 = \infty$ | $d_1 = 0.1307$ | $n_1 = 188300$ | $\nu_1 = 40.78$ |
| $r_2 = 0.5594$ | $d_2 = 0.2802$ | | |
| $r_3 = \infty$ | $d_3 = 0.8872$ | $n_2 = 1.88300$ | $\nu_2 = 40.78$ |
| $r_4 = \infty$ | $d_4 = 0.0934$ | | |

-continued

| f = 1, F/12, IH = 0.843, 2ω = 80.3° | | | |
|---|---|---|---|
| $r_5 = 10.8137$ | $d_5 = 0.4179$ | $n_3 = 1.60342$ | $\nu_3 = 38.01$ |
| $r_6 = -1.0834$ | $d_6 = 0.1167$ | | |
| $r_7 = \infty$ | $d_7 = 0.7495$ | $n_4 = 1.51633$ | $\nu_4 = 64.15$ |
| $r_8 = \infty$ (stop) | $d_8 = 0.1167$ | | |
| $r_9 = 1.5069$ | $d_9 = 0.5487$ | $n_5 = 1.51633$ | $\nu_5 = 64.15$ |
| $r_{10} = -0.09059$ | $d_{10} = 0.2335$ | | |
| $r_{11} = -0.6953$ | $d_{11} = 0.1494$ | $n_6 = 1.84666$ | $\nu_6 = 23.78$ |
| $r_{12} = \infty$ | $d_{12} = 0.1868$ | $n_7 = 1.88300$ | $\nu_7 = 40.78$ |
| $r_{13} = -1.7787$ | $d_{13} = 0.1167$ | | |
| $r_{14} = \infty$ | $d_{14} = 0.8172$ | $n_8 = 1.54869$ | $\nu_8 = 45.55$ |
| $r_{15} = \infty$ | $d_{15} = 1.8020$ | $n_9 = 1.68893$ | $\nu_9 = 31.08$ |
| $r_{16} = \infty$ | $d_{16} = 0.0005$ | | |
| $r_{17} = \infty$ | $d_{17} = 0.2526$ | $n_{10} = 1.68893$ | $\nu_{10} = 31.08$ |
| $r_{18} = \infty$ | $d_{18} = 0.0004$ | | |
| $r_{19} = \infty$ | $d_{19} = 0.1167$ | $n_{11} = 1.51633$ | $\nu_{11} = 64.15$ |
| $r_{20} = \infty$ | | | |

$|\theta_1| - |\theta_2/3| = |-17.0°| - |2.4°3| > 0$
$f_B/f = 1.75 > 1.4$
$|h_1/f_1|/|h_4f_4| = 4.78 > 1.15$
$|f_1|/f = 0.634 < 1, |f_{234}|/f = 1.204$

EMBODIMENT 7

| f = 1, F/8, IH = 0.811, 2ω = 78.1° | | | |
|---|---|---|---|
| $r_1 = \infty$ | $d_1 = 0.1124$ | $n_1 = 1.88300$ | $\nu_1 = 40.78$ |
| $r_2 = 0.3826$ | $d_2 = 0.1566$ | | |
| $r_3 = 0.7213$ | $d_3 = 0.3147$ | $n_2 = 1.72825$ | $\nu_2 = 28.46$ |
| $r_4 = -0.5618$ | $d_4 = 0.0899$ | $n_3 = 1.72916$ | $\nu_3 = 54.68$ |
| $r_5 = 1.7290$ | $d_5 = 0.2885$ | | |
| $r_6 = \infty$ (stop) | $d_6 = 0.0225$ | | |
| $r_7 = 1.9806$ | $d_7 = 0.1798$ | $n_4 = 1.51633$ | $\nu_4 = 64.15$ |
| $r_8 = -0.6210$ | $d_8 = 0.0225$ | | |
| $r_9 = 1.4344$ | $d_9 = 0.2247$ | $n_5 = 1.51633$ | $\nu_5 = 64.15$ |
| $r_{10} = -0.8141$ | $d_{10} = 0.0718$ | | |
| $r_{11} = -0.5977$ | $d_{11} = 0.1124$ | $n_6 = 1.84666$ | $\nu_6 = 23.78$ |
| $r_{12} = -2.1423$ | $d_{12} = 0.2247$ | | |
| $r_{13} = \infty$ | $d_{13} = 0.6742$ | $n_7 = 1.51633$ | $\nu_7 = 64.15$ |
| $r_{14} = \infty$ | $d_{14} = 1.9101$ | $n_8 = 1.68893$ | $\nu_8 = 31.08$ |
| $r_{15} = \infty$ | $d_{15} = 0.1348$ | $n_9 = 1.51633$ | $\nu_9 = 64.15$ |
| $r_{16} = \infty$ | | | |

$|\theta_1| - |\theta_2/3| = |-20.0°| - |3.6°/3| > 0$
$f_B/f = 1.73 > 1.4$
$|h_1/f_1|/|h_4/f_4| = 4.81 > 1.15$
$|f_1|/f = 0.433 < 1, |f_{234}|/f = 0.741$

EMBODIMENT 8

$f = 1$, F/8.0, IH = 0.714, $2\omega = 71.1°$

| | | | |
|---|---|---|---|
| $r_1 = \infty$ | | | |
| | $d_1 = 0.0990$ | $n_1 = 1.88300$ | $\nu_1 = 40.78$ |
| $r_2 = 0.3364$ | | | |
| | $d_2 = 0.1384$ | | |
| $r_3 = 0.7525$ | | | |
| | $d_3 = 0.2178$ | $n_2 = 1.72825$ | $\nu_2 = 28.46$ |
| $r_4 = -0.5937$ | | | |
| | $d_4 = 0.0792$ | $n_3 = 1.72916$ | $\nu_3 = 54.68$ |
| $r_5 = -6.6363$ | | | |
| | $d_5 = 0.2001$ | | |
| $r_6 = \infty$ (stop) | | | |
| | $d_6 = 0.0198$ | | |
| $r_7 = 8.9097$ | | | |
| | $d_7 = 0.1584$ | $n_4 = 1.51633$ | $\nu_4 = 64.15$ |
| $r_8 = -0.5278$ | | | |
| | $d_8 = 0.0198$ | | |
| $r_9 = 1.4245$ | | | |
| | $d_9 = 0.1979$ | $n_5 = 1.51633$ | $\nu_5 = 64.15$ |
| $r_{10} = -0.7237$ | | | |
| | $d_{10} = 0.0771$ | | |
| $r_{11} = -0.5271$ | | | |
| | $d_{11} = 0.0990$ | $n_6 = 1.84666$ | $\nu_6 = 23.78$ |
| $r_{12} = -2.0374$ | | | |
| | $d_{12} = 0.0792$ | | |
| $r_{13} = \infty$ | | | |
| | $d_{13} = 0.5937$ | $n_7 = 1.51633$ | $\nu_7 = 64.15$ |
| $r_{14} = \infty$ | | | |
| | $d_{14} = 1.6822$ | $n_8 = 1.68893$ | $\nu_8 = 31.08$ |
| $r_{15} = \infty$ | | | |
| | $d_{15} = 0.2969$ | $n_9 = 1.51633$ | $\nu_9 = 64.15$ |
| $r_{16} = \infty$ | | | |

$|\theta_1| - |\theta_2/3| = |-20°| - |3.6°/3| > 0$
$f_B/f = 1.48 > 1.4$
$|h_1/f_1|/|h_4/f_4| = 3.54 > 1.15$
$|f_1|/f = 0.381 < 1$, $|f_{234}|/f = 0.568$

EMBODIMENT 9

$f = 1$, F/7.6, IH = 0.829, $2\omega = 79.3°$

| | | | |
|---|---|---|---|
| $r_1 = \infty$ | | | |
| | $d_1 = 0.1149$ | $n_1 = 1.51633$ | $\nu_1 = 64.15$ |
| $r_2 = 0.4898$ | | | |
| | $d_2 = 0.9699$ | | |
| $r_3 = \infty$ | | | |
| | $d_3 = 0.1149$ | $n_2 = 1.54869$ | $\nu_2 = 45.55$ |
| $r_4 = \infty$ | | | |
| | $d_4 = 0.1126$ | $n_3 = 1.78590$ | $\nu_3 = 44.18$ |
| $r_5 = -1.5407$ | | | |
| | $d_5 = 0.0689$ | | |
| $r_6 = \infty$ (stop) | | | |
| | $d_6 = 0.2297$ | $n_4 = 1.51633$ | $\nu_4 = 64.15$ |
| $r_7 = \infty$ | | | |
| | $d_7 = 0.1149$ | | |
| $r_8 = 1.6505$ | | | |
| | $d_8 = 0.2527$ | $n_5 = 1.56384$ | $\nu_5 = 60.69$ |
| $r_9 = -0.6492$ | | | |
| | $d_9 = 0.1122$ | | |
| $r_{10} = -0.5428$ | | | |
| | $d_{10} = 0.1149$ | $n_6 = 1.72825$ | $\nu_6 = 28.46$ |
| $r_{11} = 9.0796$ | | | |
| | $d_{11} = 0.1149$ | $n_7 = 1.72916$ | $\nu_7 = 54.68$ |
| $r_{12} = -1.5806$ | | | |
| | $d_{12} = 0.1654$ | | |
| $r_{13} = \infty$ | | | |
| | $d_{13} = 0.6892$ | $n_8 = 1.54869$ | $\nu_8 = 45.55$ |
| $r_{14} = \infty$ | | | |
| | $d_{14} = 2.0216$ | $n_9 = 1.68893$ | $\nu_9 = 31.08$ |
| $r_{15} = \infty$ | | | |
| | $d_{15} = 0.1263$ | $n_{10} = 1.51633$ | $\nu_{10} = 64.15$ |
| $r_{16} = \infty$ | | | |

$|\theta_1| - |\theta_2/3| = |-18.0°| - |3.8°/3| > 0$
$f_B/f = 1.76 > 1.40$
$|h_1/f_1/51|/|h_4/f_4/51| = 2.94 > 1.15$
$|f_1|/f = 0.949$, $|f_{234}|/f = 1.133$

EMBODIMENT 10

$f = 1$, F/7.3, IH = 0.708, $2\omega = 70.6°$

| | | | |
|---|---|---|---|
| $r_1 = \infty$ | | | |
| | $d_1 = 0.0982$ | $n_1 = 1.88300$ | $\nu_1 = 40.78$ |
| $r_2 = 0.4371$ | | | |
| | $d_2 = 0.0983$ | | |
| $r_3 = \infty$ | | | |
| | $d_3 = 0.0982$ | $n_2 = 1.51633$ | $\nu_2 = 64.15$ |
| $r_4 = \infty$ | | | |
| | $d_4 = 0.0196$ | | |
| $r_5 = 1.3851$ | | | |
| | $d_5 = 0.1570$ | $n_3 = 1.84666$ | $\nu_3 = 23.78$ |
| $r_6 = -1.9631$ | | | |
| | $d_6 = 0.0982$ | $n_4 = 1.51633$ | $\nu_4 = 64.15$ |
| $r_7 = 63.9503$ | | | |
| | $d_7 = 0.4464$ | | |
| $r_8 = \infty$ (stop) | | | |
| | $d_8 = 0.0020$ | | |
| $r_9 = 1.6143$ | | | |
| | $d_9 = 0.0982$ | $n_5 = 1.51633$ | $\nu_5 = 64.15$ |
| $r_{10} = -0.5780$ | | | |
| | $d_{10} = 0.0982$ | $n_6 = 1.68893$ | $\nu_6 = 31.08$ |
| $r_{11} = -0.7627$ | | | |
| | $d_{11} = 0.0196$ | | |
| $r_{12} = 1.5267$ | | | |
| | $d_{12} = 0.1570$ | $n_7 = 1.51633$ | $\nu_7 = 64.15$ |
| $r_{13} = -0.7404$ | | | |
| | $d_{13} = 0.1178$ | | |
| $r_{14} = -0.5354$ | | | |
| | $d_{14} = 0.1178$ | $n_8 = 1.84666$ | $\nu_6 = 23.78$ |
| $r_{15} = -2.5284$ | | | |
| | $d_{15} = 0.0785$ | | |
| $r_{16} = \infty$ | | | |
| | $d_{16} = 0.5889$ | $n_9 = 1.51633$ | $\nu_9 = 64.15$ |
| $r_{17} = \infty$ | | | |
| | $d_{17} = 1.6686$ | $n_{10} = 1.68893$ | $\nu_{10} = 31.08$ |
| $r_{18} = \infty$ | | | |
| | $d_{18} = 0.2945$ | $n_{11} = 1.51633$ | $\nu_{11} = 64.15$ |
| $r_{19} = \infty$ | | | |

$|\theta_1| - |\theta_2/3| = |-20°| - |3.9°/3| > 0$
$f_B/f = 1.47 > 1.40$
$|h_1/f_1|/|h_4/f_4| = 3.61 > 1.15$
$|f_1|/f = 0.495 < 1$, $|f_{234}|/f = 0.723$

EMBODIMENT 11

$f = 1$, F/6.8, IH = 0.714, $2\omega = 71.1°$

| | | | |
|---|---|---|---|
| $r_1 = \infty$ | | | |
| | $d_1 = 0.0989$ | $n_1 = 1.88300$ | $\nu_1 = 40.78$ |
| $r_2 = 0.3198$ | | | |
| | $d_2 = 0.1369$ | | |
| $r_3 = 0.7682$ | | | |
| | $d_3 = 0.0989$ | $n_2 = 1.72825$ | $\nu_2 = 28.46$ |
| $r_4 = 11.9171$ | | | |
| | $d_4 = 0.0198$ | | |
| $r_5 = \infty$ | | | |
| | $d_5 = 0.0989$ | $n_3 = 1.72825$ | $\nu_3 = 28.46$ |
| $r_6 = -0.5935$ | | | |
| | $d_6 = 0.0989$ | $n_4 = 1.72916$ | $\nu_4 = 54.68$ |
| $r_7 = \infty$ | | | |
| | $d_7 = 0.1697$ | | |
| $r_8 =$ (stop) | | | |
| | $d_8 = 0.0198$ | | |
| $r_9 = 0.7310$ | | | |
| | $d_9 = 0.1978$ | $n_5 = 1.51633$ | $\nu_5 = 64.15$ |
| $r_{10} = -0.6141$ | | | |
| | $d_{10} = 0.0198$ | | |
| $r_{11} = 2.6598$ | | | |
| | $d_{11} = 0.1385$ | $n_6 = 1.51633$ | $\nu_6 = 64.15$ |
| $r_{12} = -0.6012$ | | | |
| | $d_{12} = 0.0893$ | | |
| $r_{13} = -0.3604$ | | | |
| | $d_{13} = 0.1187$ | $n_7 = 1.84666$ | $\nu_7 = 23.78$ |
| $r_{14} = -1.1869$ | | | |
| | $d_{14} = 0.0791$ | | |
| $r_{15} = \infty$ | | | |
| | $d_{15} = 0.5935$ | $n_8 = 1.51633$ | $\nu_8 = 64.15$ |

-continued

| f = 1, F/6.8, IH = 0.714, 2ω = 71.1° | | | |
|---|---|---|---|
| $r_{16} = \infty$ | | | |
| | $d_{16} = 1.6815$ | $n_9 = 1.68893$ | $\nu_9 = 31.08$ |
| $r_{17} = \infty$ | | | |
| | $d_{17} = 0.2967$ | $n_{10} = 1.51633$ | $\nu_{10} = 64.15$ |
| $r_{18} = \infty$ | | | |
| | $|\theta_1| - |\theta_2/3| = |-20°| - |4.2°/3| > 0$ | | |
| | $f_B/f = 1.48 > 1.40$ | | |
| | $|h_1/f_1|/|h_4/f_4| = 2.80 > 1.14$ | | |
| | $|f_1|/f = 0.361 < 1$, $|f_{234}|/f = 0.541$ | | |

EMBODIMENT 12

| f = 1, F/6.6, IH = 0.694, 2ω = 69.5° | | | |
|---|---|---|---|
| $r_1 = \infty$ | | | |
| | $d_1 = 0.0961$ | $n_1 = 1.88300$ | $\nu_1 = 40.78$ |
| $r_2 = 0.5274$ | | | |
| | $d_2 = 0.3228$ | | |
| $r_3 = -19.2890$ | | | |
| | $d_3 = 0.2947$ | $n_2 = 1.88300$ | $\nu_2 = 40.78$ |
| $r_4 = -68.9735$ | | | |
| | $d_4 = 0.0258$ | | |
| $r_5 = 1.2365$ | | | |
| | $d_5 = 0.2500$ | $n_3 = 1.64769$ | $\nu_3 = 33.80$ |
| $r_6 = 8.7930$ | | | |
| | $d_6 = 0.3015$ | | |
| $r_7 = 2.3531$ (stop) | | | |
| | $d_7 = 0.3077$ | $n_4 = 1.51633$ | $\nu_4 = 64.15$ |
| $r_8 = -0.9412$ | | | |
| | $d_8 = 0.1154$ | $n_5 = 1.84666$ | $\nu_5 = 23.78$ |
| $r_9 = -1.1878$ | | | |
| | $d_9 = 0.0192$ | | |
| $r_{10} = 2.7473$ | | | |
| | $d_{10} = 0.2966$ | $n_6 = 1.51633$ | $\nu_6 = 64.15$ |
| $r_{11} = -1.1497$ | | | |
| | $d_{11} = 0.2049$ | | |
| $r_{12} = -0.6852$ | | | |
| | $d_{12} = 0.2324$ | $n_7 = 1.88330$ | $\nu_7 = 40.78$ |
| $r_{13} = -1.1725$ | | | |
| | $d_{13} = 0.1291$ | | |
| $r_{14} = \infty$ | | | |
| | $d_{14} = 2.8846$ | $n_8 = 1.51633$ | $\nu_8 = 64.15$ |
| $r_{15} = \infty$ | | | |
| | $|\theta_1| - |\theta_2/3| = |-13.3°| - |4.3°/3| > 0$ | | |
| | $f_B/f = 1.85 > 1.40$ | | |
| | $|h_1/f_1|/|h_4/f_4| = 5.69 > 1.14$ | | |
| | $|f_1|/f = 0.597 < 1$, $|f_{234}|/f = 1.041$ | | |

EMBODIMENT 13

| f = 1, F/6.7, IH = 0.845, 2ω = 80.4° | | | |
|---|---|---|---|
| $r_1 = \infty$ | | | |
| | $d_1 = 0.1173$ | $n_1 = 1.88300$ | $\nu_1 = 40.78$ |
| $r_2 = 0.5713$ | | | |
| | $d_2 = 0.4774$ | | |
| $r_3 = 1.4113$ | | | |
| | $d_3 = 0.4928$ | $n_2 = 1.51742$ | $\nu_2 = 52.41$ |
| $r_4 = -1.0827$ | | | |
| | $d_4 = 0.0705$ | | |
| $r_5 = \infty$ (stop) | | | |
| | $d_5 = 0.6102$ | $n_3 = 1.51633$ | $\nu_3 = 64.15$ |
| $r_6 = \infty$ | | | |
| | $d_6 = 0.2323$ | | |
| $r_7 = 2.5203$ | | | |
| | $d_7 = 0.1619$ | $n_4 = 1.72825$ | $\nu_4 = 28.46$ |
| $r_8 = 0.8214$ | | | |
| | $d_8 = 0.3755$ | $n_5 = 1.72916$ | $\nu_5 = 54.68$ |
| $r_9 = -0.9814$ | | | |
| | $d_9 = 0.1643$ | | |
| $r_{10} = -0.7474$ | | | |
| | $d_{10} = 0.1173$ | $n_6 = 1.78472$ | $\nu_6 = 25.71$ |
| $r_{11} = -1.9794$ | | | |
| | $d_{11} = 0.0939$ | | |
| $r_{12} = \infty$ | | | |
| | $d_{12} = 0.8214$ | $n_7 = 1.56138$ | $\nu_7 = 45.18$ |

| f = 1, F/6.7, IH = 0.845, 2ω = 80.4° | | | |
|---|---|---|---|
| $r_{13} = \infty$ | | | |
| | $d_{13} = 0.2347$ | $n_8 = 1.51633$ | $\nu_8 = 64.15$ |
| $r_{14} = \infty$ | | | |
| | $d_{14} = 1.2204$ | $n_9 = 1.51633$ | $\nu_9 = 64.15$ |
| $r_{15} = \infty$ | | | |
| | $|\theta_1| - |\theta_2/3| = |-9.2°| - |4.3°/3| > 0$ | | |
| | $f_B/f = 1.43$ | | |
| | $|h_1/f_1|/|h_4/f_4| = 2.19 > 1.14$ | | |
| | $|f_1|/f = 0.647 < 1$, $|f_{234}|/f = 1.043$ | | |

EMBODIMENT 14

| f = 1, F/5, IH = 0.952, 2ω = 87.2° | | | |
|---|---|---|---|
| $r_1 = \infty$ | | | |
| | $d_1 = 0.1846$ | $n_1 = 1.88300$ | $\nu_1 = 40.78$ |
| $r_2 = 0.7814$ | | | |
| | $d_2 = 1.1864$ | | |
| $r_3 = 10.8176$ | | | |
| | $d_3 = 0.3725$ | $n_2 = 1.78590$ | $\nu_2 = 44.18$ |
| $r_4 = 1.2548$ | | | |
| | $d_4 = 0.9228$ | $n_3 = 1.64769$ | $\nu_3 = 33.80$ |
| $r_5 = -1.6224$ | | | |
| | $d_5 = 0.1318$ | | |
| $r_6 = \infty$ (stop) | | | |
| | $d_6 = 0.2636$ | $n_4 = 1.51633$ | $\nu_4 = 64.15$ |
| $r_7 = \infty$ | | | |
| | $d_7 = 0.3427$ | | |
| $r_8 = 4.0013$ | | | |
| | $d_8 = 0.3691$ | $n_5 = 1.53256$ | $\nu_5 = 45.91$ |
| $r_9 = -0.9941$ | | | |
| | $d_9 = 0.1318$ | $n_6 = 1.84666$ | $\nu_6 = 23.78$ |
| $r_{10} = -1.5897$ | | | |
| | $d_{10} = 0.0264$ | | |
| $r_{11} = 1.8567$ | | | |
| | $d_{11} = 0.4214$ | $n_7 = 1.72916$ | $\nu_7 = 54.68$ |
| $r_{12} = -1.5819$ | | | |
| | $d_{12} = 0.1320$ | $n_8 = 1.72825$ | $\nu_8 = 28.46$ |
| $r_{13} = 1.2837$ | | | |
| | $d_{13} = 0.4746$ | | |
| $r_{14} = \infty$ | | | |
| | $d_{14} = 0.9228$ | $n_9 = 1.54869$ | $\nu_9 = 45.55$ |
| $r_{15} = \infty$ | | | |
| | $d_{15} = 2.0348$ | $n_{10} = 1.69680$ | $\nu_{10} = 55.52$ |
| $r_{16} = \infty$ | | | |
| | $d_{16} = 0.0005$ | | |
| $r_{17} = \infty$ | | | |
| | $d_{17} = 0.2853$ | $n_{11} = 1.69680$ | $\nu_{11} = 55.52$ |
| $r_{18} = \infty$ | | | |
| | $d_{18} = 0.0004$ | | |
| $r_{19} = \infty$ | | | |
| | $d_{19} = 0.1318$ | $n_{12} = 1.51633$ | $\nu_{12} = 64.15$ |
| $r_{20} = \infty$ | | | |
| | $|\theta_1| - |\theta_2/3| = |-15.5°| - |5.7°/3| > 0$ | | |
| | $f_B/f = 2.350 > 1.40$ | | |
| | $|h_1/f_1|/|h_4/f_4| = 10.9 > 1.14$ | | |
| | $|f_1|/f = 0.885 < 1$, $|f_{234}|/f = 1.582$ | | |

EMBODIMENT 15

| f = 1, F/4.7, 2ω = 146.5° | | | |
|---|---|---|---|
| $r_1 = \infty$ (aspherical surface) | | | |
| | $d_1 = 0.5151$ | $n_1 = 1.80610$ | $\nu_1 = 40.95$ |
| $r_2 = 1.5480$ | | | |
| | $d_2 = 1.0947$ | | |
| $r_3 = -32.0618$ | | | |
| | $d_3 = 0.2382$ | $n_2 = 1.88300$ | $\nu_2 = 40.78$ |
| $r_4 = 1.9176$ | | | |
| | $d_4 = 0.4829$ | | |
| $r_5 = -40.3883$ | | | |
| | $d_5 = 0.5473$ | $n_3 = 1.72000$ | $\nu_3 = 41.98$ |
| $r_6 = -3.8023$ | | | |
| | $d_6 = 0.2640$ | | |

-continued $f = 1, F/4.7, 2\omega = 146.5°$

| | | | |
|---|---|---|---|
| $r_7 = -8.3419$ | | | |
| | $d_7 = 0.3220$ | $n_4 = 1.88300$ | $\nu_4 = 40.78$ |
| $r_8 = 3.2531$ | | | |
| | $d_8 = 0.9723$ | $n_5 = 1.64769$ | $\nu_5 = 33.80$ |
| $r_9 = -2.7882$ | | | |
| | $d_9 = 0.4572$ | | |
| $r_{10} = -11.0959$ | | | |
| | $d_{10} = 0.5023$ | $n_6 = 1.88300$ | $\nu_6 = 40.78$ |
| $r_{11} = 1.6864$ | | | |
| | $d_{11} = 0.7727$ | $n_7 = 1.61293$ | $\nu_7 = 37.00$ |
| $r_{12} = -3.6716$ | | | |
| | $d_{12} = 0.1159$ | | |
| $r_{13} = -29.0264$ | | | |
| | $d_{13} = 0.8564$ | $n_8 = 1.51472$ | $\nu_8 = 52.41$ |
| $r_{14} = -1.2260$ | | | |
| | $d_{14} = 0.3091$ | $n_9 = 1.88300$ | $\nu_9 = 40.78$ |
| $r_{15} = -1.6085$ | | | |
| | $d_{15} = 0.2576$ | | |
| $r_{16} = \infty$ (stop) | | | |
| | $d_{16} = 0.3735$ | | |
| $r_{17} = -1.6954$ | | | |
| | $d_{17} = 0.2704$ | $n_{10} = 1.77250$ | $\nu_{10} = 49.66$ |
| $r_{18} = 1.4205$ | | | |
| | $d_{18} = 0.9659$ | $n_{11} = 1.67270$ | $\nu_{11} = 32.10$ |
| $r_{19} = -9.1777$ | | | |
| | $d_{19} = 0.5924$ | | |
| $r_{20} = -4.3535$ | | | |
| | $d_{20} = 0.9015$ | $n_{12} = 1.56384$ | $\nu_{12} = 60.69$ |
| $r_{21} = -2.0509$ | | | |
| | $d_{21} = 0.1288$ | | |
| $r_{22} = \infty$ | | | |
| | $d_{22} = 0.3220$ | $n_{13} = 1.51633$ | $\nu_{13} = 64.15$ |
| $r_{23} = \infty$ | | | |
| | $d_{23} = 0.7727$ | | |
| $r_{24} = 9.8802$ | | | |
| | $d_{24} = 0.9015$ | $n_{14} = 1.53256$ | $\nu_{14} = 45.91$ |
| $r_{25} = -2.3117$ | | | |
| | $d_{25} = 0.3220$ | $n_{15} = 1.84666$ | $\nu_{15} = 23.78$ |
| $r_{26} = -3.8751$ | | | |
| | $d_{26} = 0.0644$ | | |
| $r_{27} = 4.5422$ | | | |
| | $d_{27} = 1.0174$ | $n_{16} = 1.72916$ | $\nu_{16} = 54.68$ |
| $r_{28} = -4.5422$ | | | |
| | $d_{28} = 0.3220$ | $n_{17} = 1.72825$ | $\nu_{17} = 28.46$ |
| $r_{29} = 3.1314$ | | | |
| | $d_{29} = 0.9530$ | | |
| $r_{30} = \infty$ | | | |
| | $d_{30} = 1.6549$ | $n_{18} = 1.54869$ | $\nu_{18} = 45.55$ |
| $r_{31} = \infty$ | | | |
| | $d_{31} = 0.9659$ | $n_{19} = 1.51633$ | $\nu_{19} = 64.15$ |
| $r_{32} = \infty$ | | | |
| | $d_{32} = 4.9697$ | $n_{20} = 1.69500$ | $\nu_{20} = 42.16$ |
| $r_{33} = \infty$ | | | |
| | $d_{33} = 0.0013$ | | |
| $r_{34} = \infty$ | | | |
| | $d_{34} = 0.6967$ | $n_{21} = 1.69500$ | $\nu_{21} = 42.16$ |
| $r_{35} = \infty$ | | | |
| | $d_{35} = 0.0010$ | | |
| $r_{36} = \infty$ | | | |
| | $d_{36} = 0.3220$ | $n_{22} = 1.51633$ | $\nu_{22} = 64.15$ |
| $r_{37} = \infty$ | | | | aspherical coefficient
(first surface)
$P = 1.0000, A_2 = 0.47340 \times 10^{-1}$
$A_4 = 0.28486 \times 10^{-2}, A_6 = 0.13830 \times 10^{-4}$

EMBODIMENT 16

$f = 1, F/4.4, 2\omega = 146.4°$

| | | | |
|---|---|---|---|
| $r_1 = \infty$ (aspherical surface) | | | |
| | $d_1 = 0.5115$ | $n_1 = 1.80610$ | $\nu_1 = 40.95$ |
| $r_2 = 1.5371$ | | | |
| | $d_2 = 1.0870$ | | |
| $r_3 = -31.8363$ | | | |
| | $d_3 = 0.2366$ | $n_2 = 1.88300$ | $\nu_2 = 40.78$ |
| $r_4 = 1.9041$ | | | |
| | $d_4 = 0.4795$ | | |

-continued $f = 1, F/4.4, 2\omega = 146.4°$

| | | | |
|---|---|---|---|
| $r_5 = -40.1042$ | | | |
| | $d_5 = 0.5435$ | $n_3 = 1.72000$ | $\nu_3 = 41.98$ |
| $r_6 = -3.7756$ | | | |
| | $d_6 = 0.2621$ | | |
| $r_7 = -8.2832$ | | | |
| | $d_7 = 0.3197$ | $n_4 = 1.88300$ | $\nu_4 = 40.78$ |
| $r_8 = 3.2302$ | | | |
| | $d_8 = 0.9655$ | $n_5 = 1.64769$ | $\nu_5 = 33.80$ |
| $r_9 = -2.7685$ | | | |
| | $d_9 = 0.4540$ | | |
| $r_{10} = -11.0179$ | | | |
| | $d_{10} = 0.4987$ | $n_6 = 1.88300$ | $\nu_6 = 40.78$ |
| $r_{11} = 1.6746$ | | | |
| | $d_{11} = 0.7673$ | $n_7 = 1.61293$ | $\nu_7 = 37.00$ |
| $r_{12} = -3.6458$ | | | |
| | $d_{12} = 0.1151$ | | |
| $r_{13} = -28.8223$ | | | |
| | $d_{13} = 0.8504$ | $n_8 = 1.51742$ | $\nu_8 = 52.41$ |
| $r_{14} = -1.2174$ | | | |
| | $d_{14} = 0.3069$ | $n_9 = 1.88300$ | $\nu_9 = 40.78$ |
| $r_{15} = -1.5972$ | | | |
| | $d_{15} = 0.2558$ | | |
| $r_{16} = \infty$ (stop) | | | |
| | $d_{16} = 0.3708$ | | |
| $r_{17} = -1.6835$ | | | |
| | $d_{17} = 0.2685$ | $n_{10} = 1.77250$ | $\nu_{10} = 49.66$ |
| $r_{18} = 1.4105$ | | | |
| | $d_{18} = 0.9591$ | $n_{11} = 1.67270$ | $\nu_{11} = 32.10$ |
| $r_{19} = -9.1132$ | | | |
| | $d_{19} = 0.5882$ | | |
| $r_{20} = -4.3229$ | | | |
| | $d_{20} = 0.8951$ | $n_{12} = 1.56384$ | $\nu_{12} = 60.69$ |
| $r_{21} = -2.0426$ (aspherical surface) | | | |
| | $d_{21} = 0.1279$ | | |
| $r_{22} = \infty$ | | | |
| | $d_{22} = 0.3197$ | $n_{13} = 1.51633$ | $\nu_{13} = 64.15$ |
| $r_{23} = \infty$ | | | |
| | $d_{23} = 0.7673$ | | |
| $r_{24} = 9.8107$ | | | |
| | $d_{24} = 0.8951$ | $n_{14} = 1.53256$ | $\nu_{14} = 45.91$ |
| $r_{25} = -2.2954$ | | | |
| | $d_{25} = 0.3197$ | $n_{15} = 1.84666$ | $\nu_{15} = 23.78$ |
| $r_{26} = -3.8478$ | | | |
| | $d_{26} = 0.0639$ | | |
| $r_{27} = 4.5102$ | | | |
| | $d_{27} = 1.0102$ | $n_{16} = 1.72916$ | $\nu_{16} = 54.68$ |
| $r_{28} = -4.5102$ | | | |
| | $d_{28} = 0.3197$ | $n_{17} = 1.72825$ | $\nu_{17} = 28.46$ |
| $r_{29} = 3.1093$ | | | |
| | $d_{29} = 0.9463$ | | |
| $r_{30} = \infty$ | | | |
| | $d_{30} = 1.6432$ | $n_{18} = 1.54869$ | $\nu_{18} = 45.55$ |
| $r_{31} = \infty$ | | | |
| | $d_{31} = 0.9591$ | $n_{19} = 1.51633$ | $\nu_{19} = 64.15$ |
| $r_{32} = \infty$ | | | |
| | $d_{32} = 4.9348$ | $n_{20} = 1.69500$ | $\nu_{20} = 42.16$ |
| $r_{33} = \infty$ | | | |
| | $d_{33} = 0.0013$ | | |
| $r_{34} = \infty$ | | | |
| | $d_{34} = 0.6918$ | $n_{21} = 1.69500$ | $\nu_{21} = 42.16$ |
| $r_{35} = \infty$ | | | |
| | $d_{35} = 0.0010$ | | |
| $r_{36} = \infty$ | | | |
| | $d_{36} = 0.3197$ | $n_{22} = 1.51633$ | $\nu_{22} = 64.15$ |
| $r_{37} = \infty$ | | | | aspherical coefficient
(1st surface)
$P = 1.0000, A_2 = 0.47675 \times 10^{-1}$
$A_4 = 0.29096 \times 10^{-2}, A_6 = 0.14326 \times 10^{-4}$
(21st surface)
$P = 1.0000, A_2 = 0, A_4 = -0.11610 \times 10^{-2}$
$A_6 = 0.218993 \times 10^{-2}, A_8 = -0.12008 \times 10^{-2}$

EMBODIMENT 17

$f = 1, F/4.7, 2\omega = 145.8°$ $r_1 = \infty$ (aspherical

-continued $f = 1, F/4.7, 2\omega = 145.8°$

| | | |
|---|---|---|
| surface) | | |
| $r_2 = 1.5629$ | $d_1 = 0.4937$ | $n_1 = 1.80610 \quad \nu_1 = 40.95$ |
| $r_3 = -8.5863$ | $d_2 = 1.1256$ | |
| $r_4 = 4.5944$ | $d_3 = 0.1802$ | $n_2 = 1.88300 \quad \nu_2 = 40.78$ |
| $r_5 = 11.7043$ | $d_4 = 0.4995$ | |
| $r_6 = -6.6151$ | $d_5 = 0.5609$ | $n_3 = 1.72000 \quad \nu_3 = 41.98$ |
| $r_7 = -4.1044$ | $d_6 = 0.2750$ | |
| $r_8 = 3.4956$ | $d_7 = 0.3246$ | $n_4 = 1.88300 \quad \nu_4 = 40.78$ |
| $r_9 = -3.0565$ | $d_8 = 1.0251$ | $n_5 = 1.64769 \quad \nu_5 = 33.80$ |
| $r_{10} = -5.0551$ | $d_9 = 0.4506$ | |
| $r_{11} = 1.7793$ | $d_{10} = 0.4573$ | $n_6 = 1.88300 \quad \nu_6 = 40.78$ |
| $r_{12} = -7.3603$ | $d_{11} = 0.7863$ | $n_7 = 1.61293 \quad \nu_7 = 37.00$ |
| $r_{13} = 4.0732$ | $d_{12} = 0.0724$ | |
| $r_{14} = -1.2464$ | $d_{13} = 0.8412$ | $n_8 = 1.51742 \quad \nu_8 = 52.41$ |
| $r_{15} = -1.7144$ | $d_{14} = 0.2909$ | $n_9 = 1.88300 \quad \nu_9 = 40.78$ |
| $r_{16} = \infty$ (stop) | $d_{15} = 0.3487$ | |
| $r_{17} = -1.6877$ | $d_{16} = 0.2796$ | |
| $r_{18} = -2.8333$ | $d_{17} = 0.2167$ | $n_{10} = 1.77250 \quad \nu_{10} = 49.66$ |
| $r_{19} = -8.2670$ | $d_{18} = 0.9836$ | $n_{11} = 1.67270 \quad \nu_{11} = 32.10$ |
| $r_{20} = -3.0761$ | $d_{19} = 0.5844$ | |
| $r_{21} = -2.2304$ | $d_{20} = 0.9385$ | $n_{12} = 1.56384 \quad \nu_{12} = 60.69$ |
| $r_{22} = \infty$ | $d_{21} = 0.1372$ | |
| $r_{23} = \infty$ | $d_{22} = 0.3429$ | $n_{13} = 1.51633 \quad \nu_{13} = 64.15$ |
| $r_{24} = 10.5240$ | $d_{23} = 0.8230$ | |
| $r_{25} = -2.4623$ | $d_{24} = 0.9602$ | $n_{14} = 1.53256 \quad \nu_{14} = 45.91$ |
| $r_{26} = -4.1276$ | $d_{25} = 0.3429$ | $n_{15} = 1.84666 \quad \nu_{15} = 23.78$ |
| $r_{27} = 4.8381$ | $d_{26} = 0.0686$ | |
| $r_{28} = -4.8381$ | $d_{27} = 1.0837$ | $n_{16} = 1.72916 \quad \nu_{16} = 54.68$ |
| $r_{29} = 4.2672$ (aspherical surface) | $d_{28} = 0.3429$ | $n_{17} = 1.7285 \quad \nu_{17} = 28.46$ |
| $r_{30} = \infty$ | $d_{29} = 1.0151$ | |
| $r_{31} = \infty$ | $d_{30} = 1.7627$ | $n_{18} = 1.54869 \quad \nu_{18} = 45.55$ |
| $r_{32} = \infty$ | $d_{31} = 1.0288$ | $n_{19} = 1.51633 \quad \nu_{19} = 64.15$ |
| $r_{33} = \infty$ | $d_{32} = 5.2936$ | $n_{20} = 1.69500 \quad \nu_{20} = 42.16$ |
| $r_{34} = \infty$ | $d_{33} = 0.0014$ | |
| $r_{35} = \infty$ | $d_{34} = 0.7421$ | $n_{21} = 1.69500 \quad \nu_{21} = 42.16$ |
| $r_{36} = \infty$ | $d_{35} = 0.0011$ | |
| $r_{37} = \infty$ | $d_{36} = 0.3429$ | $n_{22} = 1.51633 \quad \nu_{22} = 64.15$ | aspherical coefficient
(1st surface)
$P = 1.0000, A_2 = 0.49679 \times 10^{-1}$
$A_4 = 0.52268 \times 10^{-2}, A_6 = -0.63762 \times 10^{-4}$
(29th surface)
$P = 1.0000, A_2 = 0, A_4 = 0.56168 \times 10^{-3}$ -continued $f = 1, F/4.7, 2\omega = 145.8°$ $A_6 = 0.76142 \times 10^{-3}, A_8 = -0.16854 \times 10^{-3}$

EMBODIMENT 18

$f = 1, F/5.0, 2\omega = 145.8°$

| | | |
|---|---|---|
| $r_1 = \infty$ (aspherical surface) | $d_1 = 0.2020$ | $n_1 = 1.80610 \quad \nu_1 = 40.95$ |
| $r_2 = 1.4616$ | $d_2 = 1.2615$ | |
| $r_3 = -13.4981$ | $d_3 = 0.3505$ | $n_2 = 1.88300 \quad \nu_2 = 40.78$ |
| $r_4 = 2.9393$ | $d_4 = 1.3078$ | |
| $r_5 = -40.1282$ | $d_5 = 1.2811$ | $n_3 = 1.60717 \quad \nu_3 = 40.26$ |
| $r_6 = -3.0037$ | $d_6 = 1.3906$ | |
| $r_7 = -34.4369$ | $d_7 = 1.2036$ | $n_4 = 1.49700 \quad \nu_4 = 81.61$ |
| $r_8 = -2.0586$ | $d_8 = 0.2105$ | |
| $r_9 = \infty$ (stop) | $d_9 = 0.3601$ | |
| $r_{10} = -1.6992$ | $d_{10} = 0.2223$ | $n_5 = 1.77250 \quad \nu_5 = 49.66$ |
| $r_{11} = 1.2067$ | $d_{11} = 1.0362$ | $n_6 = 1.67270 \quad \nu_6 = 32.10$ |
| $r_{12} = -6.2799$ | $d_{12} = 0.6948$ | |
| $r_{13} = -9.3087$ | $d_{13} = 0.9763$ | $n_7 = 1.56384 \quad \nu_7 = 60.69$ |
| $r_{14} = -3.4161$ (aspherical surface) | $d_{14} = 0.1347$ | |
| $r_{15} = \infty$ | $d_{15} = 0.3367$ | $n_8 = 1.51633 \quad \nu_8 = 64.15$ |
| $r_{16} = \infty$ | $d_{16} = 0.8081$ | |
| $r_{17} = -17.4362$ | $d_{17} = 0.9428$ | $n_9 = 1.53265 \quad \nu_9 = 45.91$ |
| $r_{18} = -2.4312$ | $d_{18} = 0.3367$ | $n_{10} = 1.84666 \quad \nu_{10} = 23.78$ |
| $r_{19} = -5.0008$ | $d_{19} = 0.0673$ | |
| $r_{20} = 6.5728$ | $d_{20} = 1.0640$ | $n_{11} = 1.72916 \quad \nu_{11} = 54.68$ |
| $r_{21} = -4.3771$ | $d_{21} = 0.3367$ | $n_{12} = 1.72825 \quad \nu_{12} = 28.46$ |
| $r_{22} = -15.4030$ (aspherical surface) | $d_{22} = 0.9966$ | |
| $r_{23} = \infty$ | $d_{23} = 1.7306$ | $n_{13} = 1.54869 \quad \nu_{13} = 45.55$ |
| $r_{24} = \infty$ | $d_{24} = 1.0101$ | $n_{14} = 1.51633 \quad \nu_{14} = 64.15$ |
| $r_{25} = \infty$ | $d_{25} = 5.1973$ | $n_{15} = 1.69500 \quad \nu_{15} = 42.16$ |
| $r_{26} = \infty$ | $d_{26} = 0.0013$ | |
| $r_{27} = \infty$ | $d_{27} = 0.7286$ | $n_{16} = 1.69500 \quad \nu_{16} = 42.16$ |
| $r_{28} = \infty$ | $d_{28} = 0.0011$ | |
| $r_{29} = \infty$ | $d_{29} = 0.3367$ | $n_{17} = 1.51633 \quad \nu_{17} = 64.15$ |
| $r_{30} = \infty$ | | | aspherical coefficient
(1st surface)
$P = 1.0000, A_2 = 0.94982 \times 10^{-1}$
$A_4 = 0.29303 \times 10^{-2}, A_6 = 0.94836 \times 10^{-4}$
(14th surface)
$P = 1.0000, A_2 = 0, A_4 = -0.15782 \times 10^{-1}$
$A_6 = 0.57010 \times 10^{-3}, A_8 = -0.62758 \times 10^{-3}$
(22nd surface)
$P = 1.0000, A_2 = 0, A_4 = 0.41262 \times 10^{-2}$ -continued

| f = 1, F/5.0, 2ω = 145.8° |
|---|
| $A_6 = -0.32732 \times 10^{-5}$, $A_8 = -0.94554 \times 10^{-5}$ |

EMBODIMENT 19 f = 1, F/9.1, 2ω = 142.1°

| | | | |
|---|---|---|---|
| $r_1 = \infty$ | | | |
| | $d_1 = 0.2337$ | $n_1 = 1.80610$ | $\nu_1 = 40.95$ |
| $r_2 = 1.5991$ (aspherical surface) | | | |
| | $d_2 = 1.1432$ | | |
| $r_3 = 1.5569$ | | | |
| | $d_3 = 0.3735$ | $n_2 = 1.88300$ | $\nu_2 = 40.78$ |
| $r_4 = 1.7491$ | | | |
| | $d_4 = 0.3325$ | | |
| $r_5 = 4.4949$ | | | |
| | $d_5 = 0.5109$ | $n_3 = 1.72000$ | $\nu_3 = 41.98$ |
| $r_6 = -5.8820$ | | | |
| | $d_6 = 0.1516$ | | |
| $r_7 = -3.0884$ | | | |
| | $d_7 = 0.3524$ | $n_4 = 1.88300$ | $\nu_4 = 40.78$ |
| $r_8 = 2.3779$ | | | |
| | $d_8 = 0.7328$ | $n_5 = 1.64769$ | $\nu_5 = 33.80$ |
| $r_9 = -2.0791$ | | | |
| | $d_9 = 0.1260$ | | |
| $r_{10} = -5.7663$ | | | |
| | $d_{10} = 0.3389$ | $n_6 = 1.88300$ | $\nu_6 = 40.78$ |
| $r_{11} = 1.2176$ | | | |
| | $d_{11} = 0.3996$ | $n_7 = 1.61293$ | $\nu_7 = 37.00$ |
| $r_{12} = -25.4187$ | | | |
| | $d_{12} = 0.2875$ | | |
| $r_{13} = \infty$ (stop) | | | |
| | $d_{13} = 0.1551$ | | |
| $r_{14} = -1.2876$ | | | |
| | $d_{14} = 0.0982$ | $n_8 = 1.77250$ | $\nu_8 = 49.66$ |
| $r_{15} = -1.5787$ | | | |
| | $d_{15} = 0.6155$ | $n_9 = 1.67270$ | $\nu_9 = 32.10$ |
| $r_{16} = -1.9929$ | | | |
| | $d_{16} = 0.3249$ | | |
| $r_{17} = -1.9919$ | | | |
| | $d_{17} = 0.5966$ | $n_{10} = 1.56384$ | $\nu_{10} = 60.69$ |
| $r_{18} = -3.1955$ | | | |
| | $d_{18} = 0.0932$ | | |
| $r_{19} = \infty$ | | | |
| | $d_{19} = 0.2331$ | $n_{11} = 1.51633$ | $\nu_{11} = 64.15$ |
| $r_{20} = \infty$ | | | |
| | $d_{20} = 0.5639$ | | |
| $r_{21} = 7.1534$ | | | |
| | $d_{21} = 0.6527$ | $n_{12} = 1.53256$ | $\nu_{12} = 45.91$ |
| $r_{22} = -1.7845$ | | | |
| | $d_{22} = 0.2331$ | $n_{13} = 1.84666$ | $\nu_{13} = 23.78$ |
| $r_{23} = -2.8090$ | | | |
| | $d_{23} = 0.0466$ | | |
| $r_{24} = 3.3785$ | | | |
| | $d_{24} = 0.7366$ | $n_{14} = 1.72916$ | $\nu_{14} = 54.68$ |
| $r_{25} = -3.5129$ | | | |
| | $d_{25} = 0.2331$ | $n_{15} = 1.72825$ | $\nu_{15} = 28.46$ |
| $r_{26} = 14.5134$ (aspherical surface) | | | |
| | $d_{26} = 1.2613$ | | |
| $r_{27} = \infty$ | | | |
| | $d_{27} = 1.1981$ | $n_{16} = 1.54869$ | $\nu_{16} = 45.55$ |
| $r_{28} = \infty$ | | | |
| | $d_{28} = 0.6993$ | $n_{17} = 1.51633$ | $\nu_{17} = 64.25$ |
| $r_{29} = \infty$ | | | |
| | $d_{29} = 3.5981$ | $n_{18} = 1.69500$ | $\nu_{18} = 42.16$ |
| $r_{30} = \infty$ | | | |
| | $d_{30} = 0.0009$ | | |
| $r_{31} = \infty$ | | | |
| | $d_{31} = 0.5044$ | $n_{19} = 1.69500$ | $\nu_{19} = 42.16$ |
| $r_{32} = \infty$ | | | |
| | $d_{32} = 0.0007$ | | |
| $r_{33} = \infty$ | | | |
| | $d_{33} = 0.2331$ | $n_{20} = 1.51633$ | $\nu_{20} = 64.15$ |
| $r_{34} = \infty$ | | | | aspherical coefficient
(2nd surface)

-continued

| f = 1, F/9.1, 2ω = 142.1° |
|---|
| $P = 1.0000$, $A_2 = 0$, $A_4 = 0.28196 \times 10^{-1}$ |
| $A_6 = -0.10679 \times 10^{-2}$, $A_8 = -0.94190 \times 10^{-2}$ |
| (26th surface) |
| $P = 1.0000$, $A_2 = 0$, $A_4 = -0.95353 \times 10^{-2}$ |
| $A_6 = 0.13881 \times 10^{-1}$, $A_8 = -0.31650 \times 10^{-2}$ |

EMBODIMENT 20 f = 1, F/3.8, 2ω = 145.9°

| | | | |
|---|---|---|---|
| $r_1 = \infty$ (aspherical surface) | | | |
| | $d_1 = 0.3981$ | $n_1 = 1.88300$ | $\nu_1 = 40.78$ |
| $r_2 = 1.8193$ | | | |
| | $d_2 = 1.3090$ | | |
| $r_3 = -72.8908$ | | | |
| | $d_3 = 0.2807$ | $n_2 = 1.88300$ | $\nu_2 = 40.78$ |
| $r_4 = 2.7932$ | | | |
| | $d_4 = 0.7149$ | | |
| $r_5 = -5.6555$ | | | |
| | $d_5 = 0.2276$ | $n_3 = 1.72000$ | $\nu_3 = 50.25$ |
| $r_6 = -11.5634$ | | | |
| | $d_6 = 1.1766$ | | |
| $r_7 = -27.6215$ | | | |
| | $d_7 = 0.2352$ | $n_4 = 1.88300$ | $\nu_4 = 40.78$ |
| $r_8 = 3.2495$ | | | |
| | $d_8 = 1.2140$ | $n_5 = 1.65128$ | $\nu_5 = 38.25$ |
| $r_9 = -3.3711$ | | | |
| | $d_9 = 1.7377$ | | |
| $r_{10} = -8.2722$ | | | |
| | $d_{10} = 0.6337$ | $n_6 = 1.88300$ | $\nu_6 = 40.78$ |
| $r_{11} = -1.8539$ | | | |
| | $d_{11} = 0.5996$ | $n_7 = 1.67003$ | $\nu_7 = 47.25$ |
| $r_{12} = 7.6520$ | | | |
| | $d_{12} = 1.6012$ | | |
| $r_{13} = 8.7536$ | | | |
| | $d_{13} = 1.0061$ | $n_8 = 1.58144$ | $\nu_8 = 40.75$ |
| $r_{14} = -1.4719$ | | | |
| | $d_{14} = 0.3642$ | $n_9 = 1.88300$ | $\nu_9 = 40.78$ |
| $r_{15} = -5.6501$ | | | |
| | $d_{15} = 0.3036$ | | |
| $r_{16} = \infty$ (stop) | | | |
| | $d_{16} = 0.4403$ | | |
| $r_{17} = 16.7439$ | | | |
| | $d_{17} = 0.3111$ | $n_{10} = 1.88300$ | $\nu_{10} = 40.78$ |
| $r_{18} = 3.2671$ | | | |
| | $d_{18} = 0.9105$ | $n_{11} = 1.64769$ | $\nu_{11} = 33.80$ |
| $r_{19} = 8.5524$ | | | |
| | $d_{19} = 0.6829$ | | |
| $r_{20} = -5.9879$ | | | |
| | $d_{20} = 0.6829$ | $n_{12} = 1.57309$ | $\nu_{12} = 42.57$ |
| $r_{21} = -2.5176$ (aspherical surface) | | | |
| | $d_{21} = 0.1517$ | | |
| $r_{22} = \infty$ | | | |
| | $d_{22} = 0.3794$ | $n_{13} = 1.51633$ | $\nu_{13} = 64.15$ |
| $r_{23} = \infty$ | | | |
| | $d_{23} = 0.9105$ | | |
| $r_{24} = 11.6419$ | | | |
| | $d_{24} = 1.0622$ | $n_{14} = 1.53256$ | $\nu_{15} = 45.91$ |
| $r_{25} = -2.7238$ | | | |
| | $d_{25} = 0.3794$ | $n_{15} = 1.84666$ | $\nu_{15} = 23.78$ |
| $r_{26} = -4.5660$ | | | |
| | $d_{26} = 0.0759$ | | |
| $r_{27} = 5.3520$ | | | |
| | $d_{27} = 1.1988$ | $n_{16} = 1.72916$ | $\nu_{16} = 54.68$ |
| $r_{28} = -5.3520$ | | | |
| | $d_{28} = 0.3794$ | $n_{17} = 1.72825$ | $\nu_{17} = 28.46$ |
| $r_{29} = 3.6897$ | | | |
| | $d_{29} = 1.1229$ | | |
| $r_{30} = \infty$ | | | |
| | $d_{30} = 1.9499$ | $n_{18} = 1.54869$ | $\nu_{18} = 45.55$ |
| $r_{31} = \infty$ | | | |
| | $d_{31} = 1.1381$ | $n_{19} = 1.51633$ | $\nu_{19} = 64.15$ |
| $r_{32} = \infty$ | | | |
| | $d_{32} = 5.8558$ | $n_{20} = 1.69500$ | $\nu_{20} = 42.16$ |
| $r_{33} = \infty$ | | | |
| | $d_{33} = 0.0015$ | | |

-continued $f = 1, F/3.8, 2\omega = 145.9°$

| | | | |
|---|---|---|---|
| $r_{34} = \infty$ | | | |
| | $d_{34} = 0.8209$ | $n_{21} = 1.69500$ | $\nu_{21} = 42.16$ |
| $r_{35} = \infty$ | | | |
| | $d_{35} = 0.0012$ | | |
| $r_{36} = \infty$ | | | |
| | $d_{36} = 0.3794$ | $n_{22} = 1.51633$ | $\nu_{22} = 64.15$ |
| $r_{37} = \infty$ | | | | aspherical coefficient
(1st surface)
$P = 1.0000, A_2 = 0.10402$
$A_4 = 0.68546 \times 10^{-2}, A_6 = -0.79544 \times 10^{-4}$
(21st surface)
$P = 1.0000, A_2 = 0, A_4 = -0.13817 \times 10^{-2}$
$A_6 = 0.44990 \times 10^{-3}, A_8 = -0.36433 \times 10^{-3}$

EMBODIMENT 21

$f = 1, F/7.9, 2\omega = 146.4°$

| | | | |
|---|---|---|---|
| $r_1 = 12.1744$ (aspherical surface) | | | |
| | $d_1 = 0.3522$ | $n_1 = 1.78472$ | $\nu_1 = 25.71$ |
| $r_2 = 2.1612$ | | | |
| | $d_2 = 0.7383$ | | |
| $r_3 = -27.5173$ | | | |
| | $d_3 = 0.2483$ | $n_2 = 1.67003$ | $\nu_2 = 47.25$ |
| $r_4 = 1.7754$ | | | |
| | $d_4 = 0.4832$ | | |
| $r_5 = -12.2444$ | | | |
| | $d_5 = 0.2248$ | $n_3 = 1.69350$ | $\nu_3 = 53.23$ |
| $r_6 = 4.1759$ | | | |
| | $d_6 = 0.9089$ | | |
| $r_7 = 45.2934$ | | | |
| | $d_7 = 0.2081$ | $n_4 = 1.88300$ | $\nu_4 = 40.78$ |
| $r_8 = 3.1181$ | | | |
| | $d_8 = 0.9904$ | $n_5 = 1.64769$ | $\nu_5 = 33.80$ |
| $r_9 = -2.1117$ | | | |
| | $d_9 = 2.4683$ | | |
| $r_{10} = -3.8865$ | | | |
| | $d_{10} = 0.8900$ | $n_6 = 1.88300$ | $\nu_6 = 40.78$ |
| $r_{11} = 0.9464$ | | | |
| | $d_{11} = 0.3222$ | $n_7 = 1.64769$ | $\nu_7 = 33.80$ |
| $r_{12} = -2.1675$ | | | |
| | $d_{12} = 0.2685$ | | |
| $r_{13} = \infty$ (stop) | | | |
| | $d_{13} = 0.3895$ | | |
| $r_{14} = -1.1780$ | | | |
| | $d_{14} = 0.2752$ | $n_8 = 1.78590$ | $\nu_8 = 44.18$ |
| $r_{15} = -0.6712$ | | | |
| | $d_{15} = 1.2807$ | $n_9 = 1.56384$ | $\nu_9 = 60.69$ |
| $r_{16} = -1.9170$ (aspherical surface) | | | |
| | $d_{16} = 0.1342$ | | |
| $r_{17} = \infty$ | | | |
| | $d_{17} = 0.6712$ | $n_{10} = 1.51633$ | $\nu_{10} = 64.15$ |
| $r_{18} = \infty$ | | | |
| | $d_{18} = 0.8725$ | | |
| $r_{19} = 10.2985$ | | | |
| | $d_{19} = 0.9396$ | $n_{11} = 1.53256$ | $\nu_{11} = 45.91$ |
| $r_{20} = -2.4095$ | | | |
| | $d_{20} = 0.3356$ | $n_{12} = 1.84666$ | $\nu_{12} = 23.78$ |
| $r_{21} = -4.0391$ | | | |
| | $d_{21} = 0.0671$ | | |
| $r_{22} = 4.7344$ | | | |
| | $d_{22} = 1.0739$ | $n_{13} = 1.72916$ | $\nu_{13} = 54.68$ |
| $r_{23} = -4.7344$ | | | |
| | $d_{23} = 0.3356$ | $n_{14} = 1.72825$ | $\nu_{14} = 28.46$ |
| $r_{24} = 3.2639$ | | | |
| | $d_{24} = 1.2081$ | | |
| $r_{25} = \infty$ | | | |
| | $d_{25} = 2.3491$ | $n_{15} = 1.54869$ | $\nu_{15} = 45.55$ |
| $r_{26} = \infty$ | | | |
| | $d_{26} = 5.1801$ | $n_{16} = 1.69500$ | $\nu_{16} = 42.16$ |
| $r_{27} = \infty$ | | | |
| | $d_{27} = 0.0013$ | | |
| $r_{28} = \infty$ | | | |
| | $d_{28} = 0.7262$ | $n_{17} = 1.69500$ | $\nu_{17} = 42.16$ |

-continued $f = 1, F/7.9, 2\omega = 146.4°$

| | | | |
|---|---|---|---|
| $r_{29} = \infty$ | | | |
| | $d_{29} = 0.0011$ | | |
| $r_{30} = \infty$ | | | |
| | $d_{30} = 0.3356$ | $n_{18} = 1.5166$ | $\nu_{18} = 64.15$ |
| $r_{31} = \infty$ | | | | aspherical coefficient
(1st surface)
$P = -1.2757, A_2 = 0$
$A_4 = 0.18319 \times 10^{-2}, A_6 = -0.29742 \times 10^{-4}$
$A_8 = 0.58713 \times 10^{-6}, A_{10} = 0.41324 \times 10^{-7}$
$A_{12} = -0.86217 \times 10^{-8}$
$A_{14} = 0.52716 \times 10^{-8}$
$A_{16} = 0.31216 \times 10^{-11}$
$A_{18} = -0.16519 \times 10^{-9}$
$A_{20} = -0.11530 \times 10^{-12}$
(16th surface)
$P = 0.2643, A_2 = 0$
$A_4 = -0.11837 \times 10^{-2}, A_6 = 0.16746 \times 10^{-1}$
$A_8 = -0.12472 \times 10^{-1}$
$A_{10} = -0.10773 \times 10^{-1}$
$A_{12} = -0.11794 \times 10^{-1}$
$A_{14} = 0.38049 \times 10^{-9}$
$A_{16} = 0.32762 \times 10^{-16}$
$A_{18} = -0.90619 \times 10^{-18}$
$A_{20} = -0.37055 \times 10^{-21}$ wherein the reference symbols $r_1, r_2, \ldots$ represent radii of curvature on the surfaces of the respective lens elements, the reference symbols $d_1, d_2, \ldots$ designate thicknesses of the respective lens elements and airspaces reserved therebetween, the reference symbol $n_1, n_2, \ldots$ denote refractive indices of the respective lens elements, the reference symbols $\nu_1, \nu_2, \ldots$ represent Abbe's numbers of the respective lens elements, and the reference symbol I designates height of image.

Figure 2:
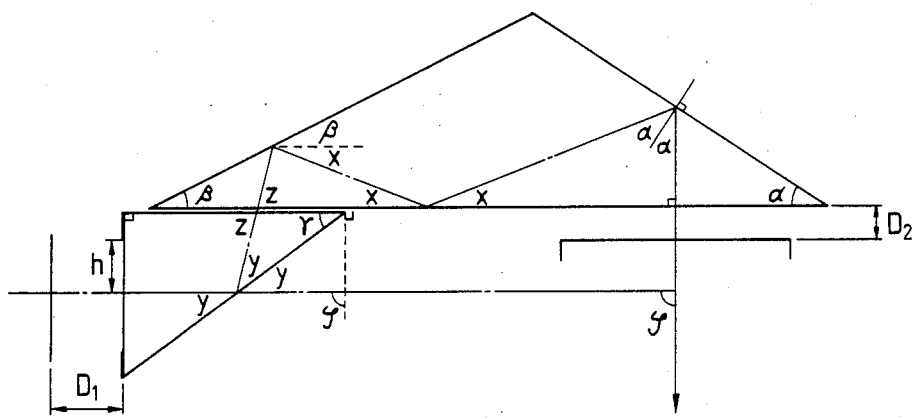
FIG. 2 shows a sectional view illustrating an example of the optical path deflecting system to be used in said lens system.
Figure 3B:
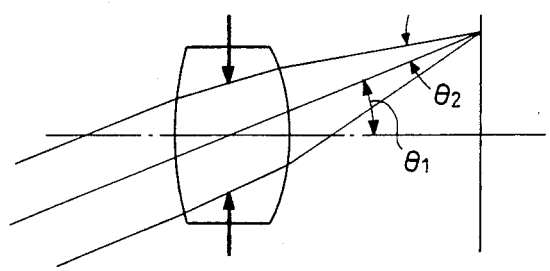
FIG. 3B shows a diagram illustrating state of rays after having passed through the objective lens system.
Figure 3A:
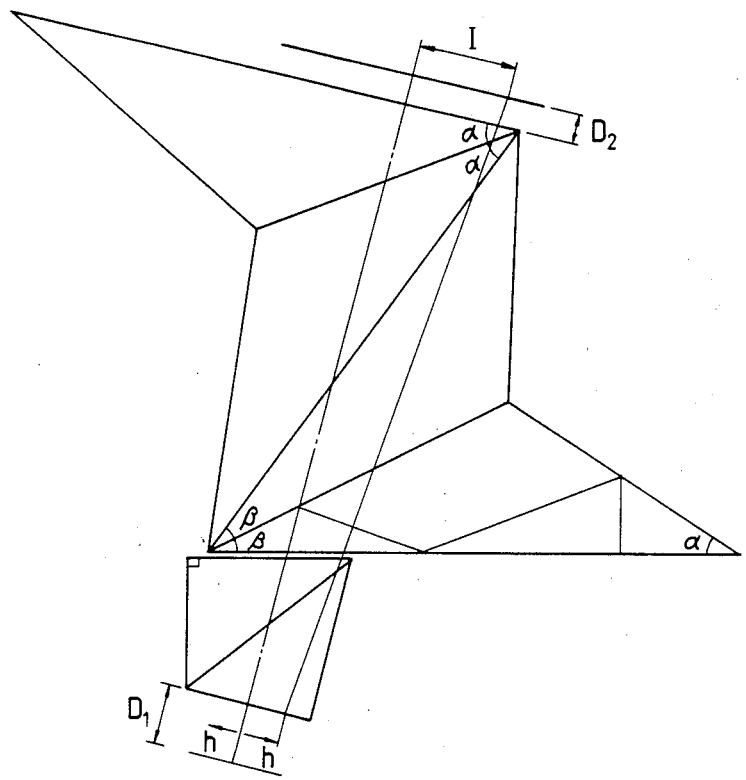
FIG. 3A shows a development diagram of said optical path deflecting system.
Figure 4:
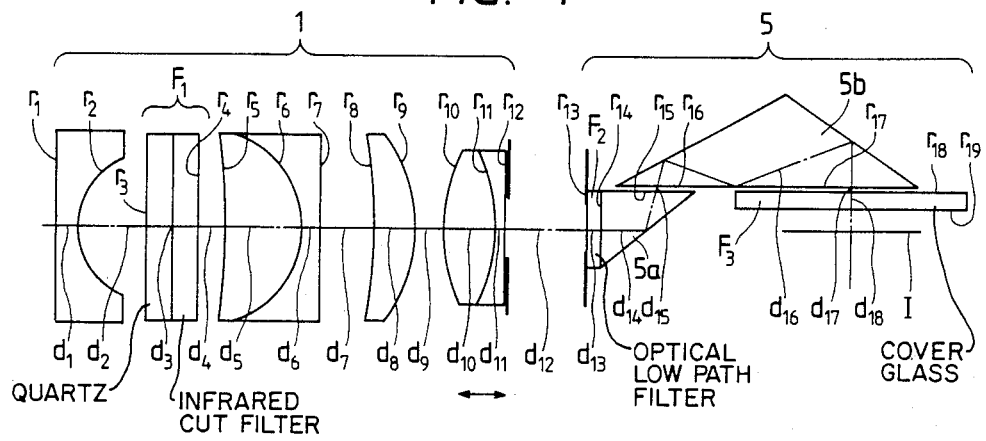
FIG. 4 through FIG. 24 show sectional views illustrating compositions of Embodiment 1 through 21 of the present invention.
Figure 5:
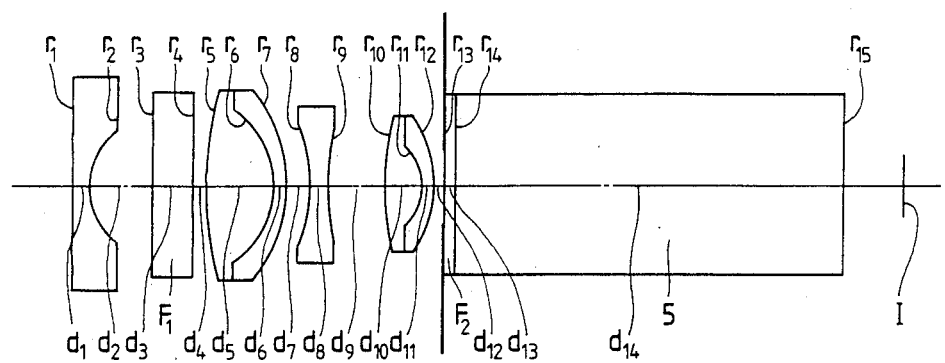
Figure 6:
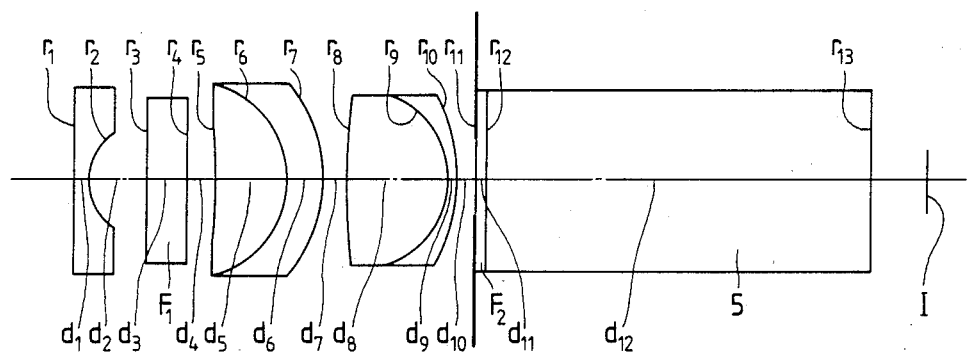
Figure 7:
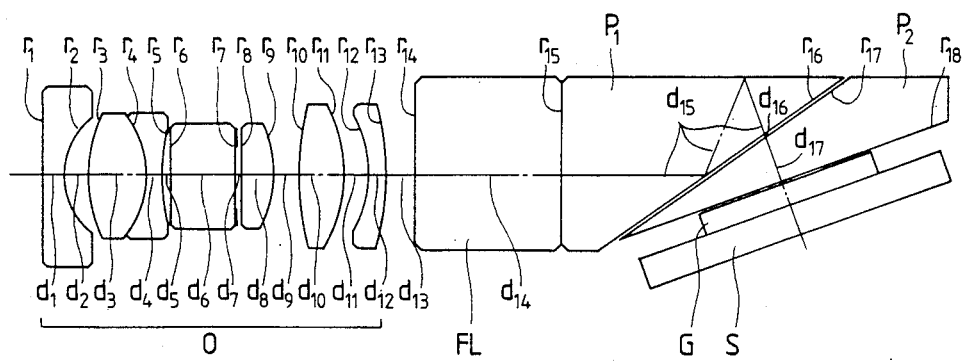
Figure 8:
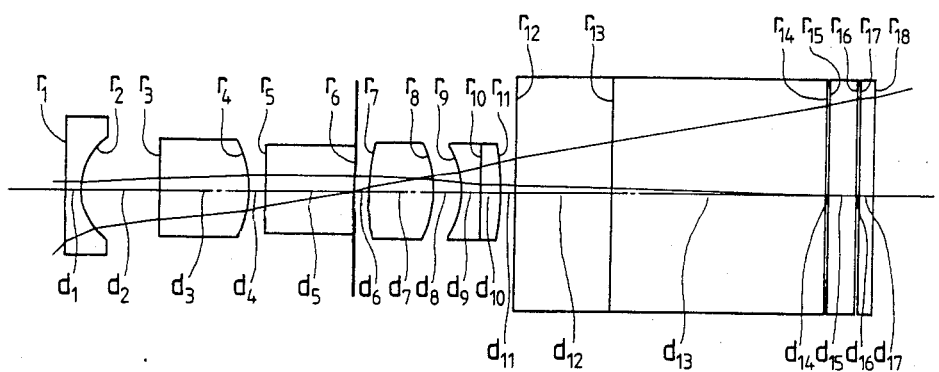
Figure 9:
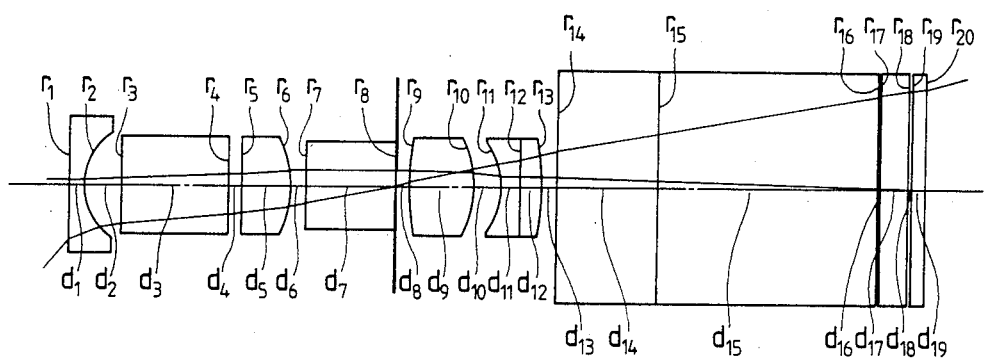
Figure 10:
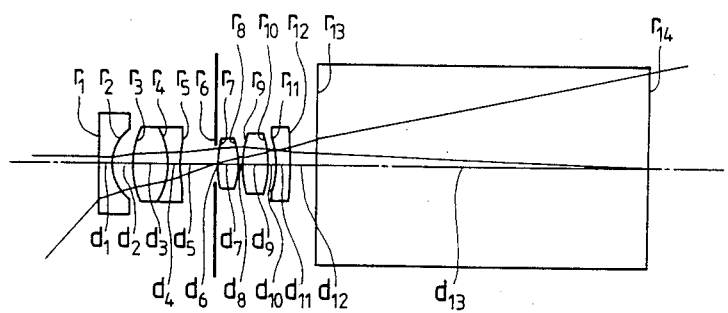
Figure 11:
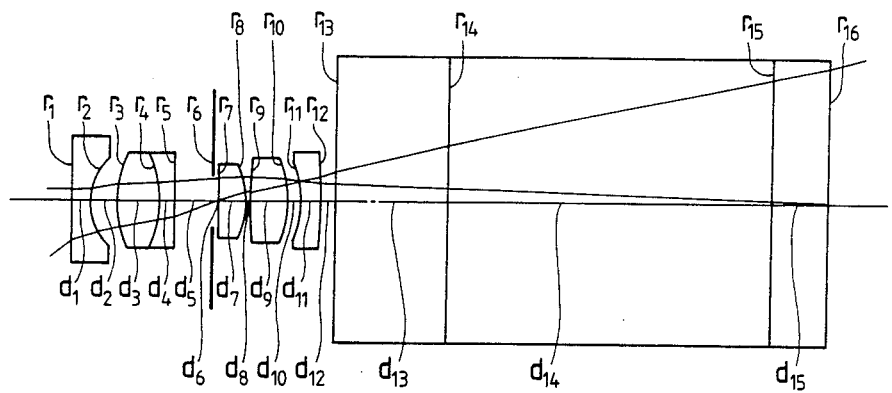
Figure 12:
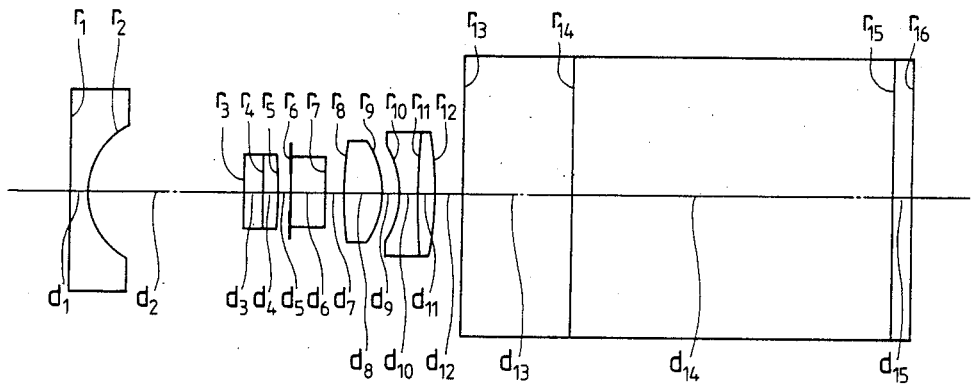
Figure 13:
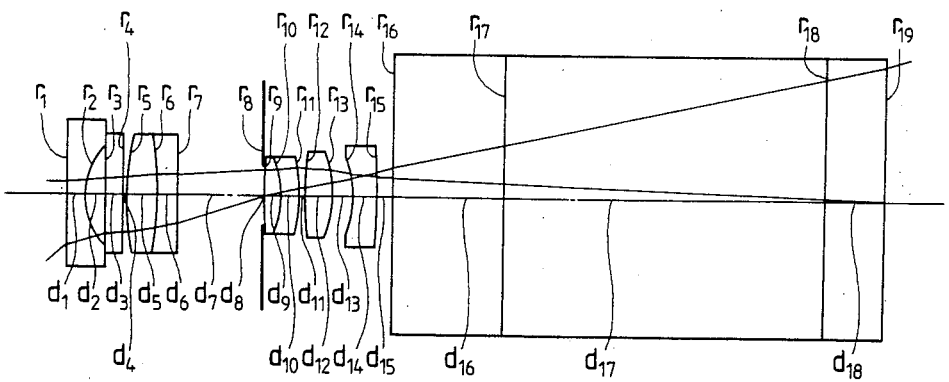
Figure 14:
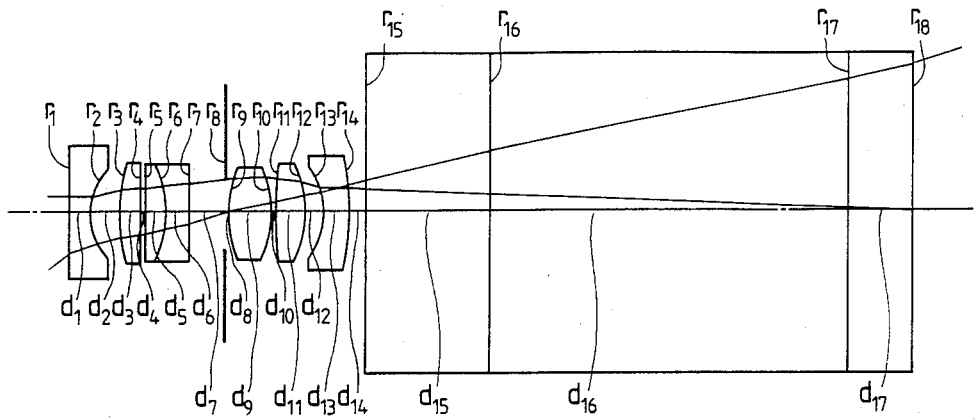
Figure 15:
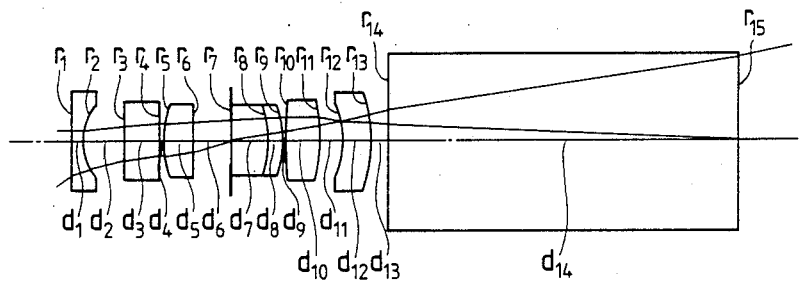
Figure 16:
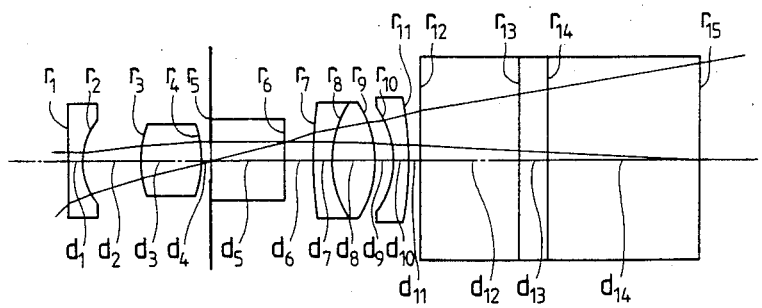
Figure 17:
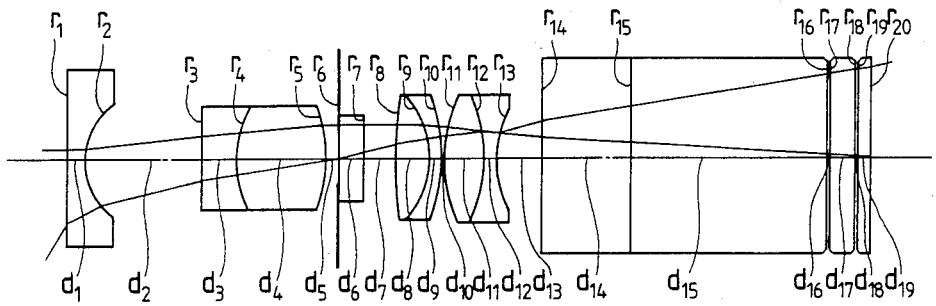

The Embodiment 1 through 3A have the compositions illustrated in FIG. 4 through FIG. 6. In these Embodiments, an optical path deflecting system consisting of prisms as shown in FIG. 2 is arranged after an objective lens system. This optical path deflecting system is shown as a single glass block in the drawings other than FIG. 4. In these Embodiments, the front lens unit comprises a negative lens component, whereas the rear lens unit comprises a plural number of lens components including at least one positive cemented doublet consisting of a positive lens element and a negative lens elements. When refractive indices of said positive lens element and said negative lens element of the positive cemented doublet (the cemented doublet arranged on the extreme object side when two or more cemented doublets are included) in the rear lens unit are represented by $n_p$ and $n_n$ respectively, and Abbe's numbers of said positive and negative lens elements are designated by $\nu_p$ and $\nu_n$ respectively, it is desirable to satisfy the following conditions (9) and (10):

$$n_p > n_n \quad (9)$$

$$\nu_p < \nu_n \quad (10)$$

By designing so as to satisfy these conditions, the rear lens unit is so adapted as to converge the diverging ray incident on the cemented doublet with the positive power of the cemented surface in addition to the positive power of the cemented doublet as a whole, thereby positively correct lateral chromatic aberration, negatively correcting longitudinal chromatic aberration and positively correcting lower lateral coma.

Accordingly, as a result, it is possible to cancel the chromatic aberration and coma produced by the cemented doublet arranged on the image side of said cemented doublet and the front lens unit, and favorably correct aberrations in the objective lens system as a whole.

If the above-mentioned conditions (9) or (10) is not satisfied, the lateral chromatic aberration will be undercorrected and the longitudinal chromatic aberration will be overcorrected.

Further, the Embodiment 4 through 14 have the compositions shown in FIG. 7 through FIG. 17 wherein the front lens unit consists of a single negative lens component and the rear lens unit has an aperture stop at a location relatively near the object point, i.e., at an intermediate location in the objective lens system. An objective lens system having such a composition can correct distortion favorably. Speaking concretely, by arranging the aperture stop at the location described above, the incident angle of the principal ray on the image plane can be enlarged and distortion can be corrected more effectively since the aperture stop is located rearward as compared with the location of an aperture stop used in the ordinary telecentric type retrofocus objective lens system for endoscopes. Further, when the aperture stop is arranged at the location described above, the objective lens system does not have the remarkably asymmetrical composition of the retrofocus type lens system wherein a stop is arranged between a diverging lens unit and a converging lens unit, and only negative lens components are arranged before the stop and only positive lens components are arranged after the stop. In other words, when some of the lenses having positive refractive power are arranged before the stop, the asymmetrical composition of the lens system with regard to the stop is moderated. This design facilitates correction of distortion and is advantageous for correction of coma.

In these Embodiments, a lens component having a concave surface with high curvature is arranged on the extreme image side in the rear lens unit. It is desirable to design this lens component so as to satisfy the following condition (11):

$$|h_1\phi_1| > 1.15|h_4\phi_4| \qquad (11)$$

wherein the reference symbol $h_1$ represents height of ray at the lens component arranged on the extreme object side, the reference symbol $\phi_1$ designates power of this lens component, the reference symbol $h_4$ denotes average height of principal ray at the lens component arranged on the extreme image side, and the reference symbol $\phi_4$ represents power of this lens component.

The objective lens systems preferred as these Embodiments are so designed as to prevent quantity of the marginal ray from being reduced so much by imparting stronger refractive power $|h_1\phi_1|$ for the principal ray to the lens component arranged on the extreme object side than the refractive power $|h_4\phi_4|$ for the principal ray imparted to the lens component arranged on the extreme image side. Accordingly, these objective lens systems are so designed as to satisfy the above-mentioned condition (11). If the condition (11) is not satisfied, it is impossible to correct distortion and the objective lens systems must be enlarged.

Further, it is desirable to design the objective lens systems having the compositions described in these Embodiments in such a manner that radius of curvature $R_1$ of the lens component arranged on the extreme object side and radius of curvature $R_4$ of the lens component arranged on the extreme image side satisfy the following conditions (12) and (13):

$$0.2 < |R_1|/f < 10 \qquad (12)$$

$$0.2 < |R_4|/f < 10 \qquad (13)$$

If the lower limits of these conditions are exceeded, it will be difficult to correct coma favorably. If the upper limits of these conditions are exceeded, it will be impossible to minimize diameters of the lens component arranged on the extreme object side and the lens component arranged on the extreme image side, and it will be impossible to enable minimizing the prisms to be arranged after the objective lens system by diverging the principal ray emerging from the objective lens system.

The Embodiment 15 through 21 have the compositions illustrated in FIG. 18 through FIG. 24 wherein the front lens unit is represented by a reference symbol I and the rear lens unit is designated by a reference symbol II. In each of these Embodiments, an aperture stop is arranged in the rear lens unit and an aspherical surface is used before the aperture stop.

When the aspherical surface faces the object side, it has portions whose curvature becomes gradually higher as said portions are farther from the optical axis. When the aspherical surface faces the image side, it has portions whose curvature becomes gradually lower as said portions are farther from the optical axis.

Figure 25:
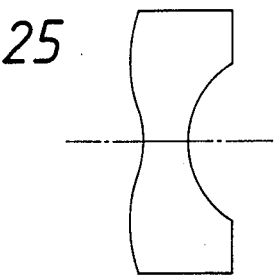
FIG. 25 shows a sectional view illustrating an aspherical surface used in the Embodiments of the present invention.

Magnitude of the curvature is to be considered including the positive and negative signs. Speaking concretely, the curvature has the negative or positive sign depending on whether the center of a tangential circle at an optional point on the surface of interest is located on the object or image side of the surface, and curvature is higher in the negative-zero-positive order. The object side surface of the aspherical lens component shown in FIG. 25, for example, has negative curvature in the vicinity of the optical axis, higher curvature on the portions farther from the optical axis and positive curvature at the marginal portions (shape convex on the object side).

When the aspherical surface described above is used, this surface has a negative function which is weakened or a positive function which is strengthened toward the marginal portion thereof. Since the aspherical surface has the function to weaken the refractive power of the lens components arranged before the stop for the principal ray, it is possible to correct the distortion produced by these lens components.

When the direction of the optical axis is taken as the x axis and the direction perpendicular to the optical axis is taken as the y axis, the shapes of the aspherical surfaces used in the above-described Embodiments are expressed by the following formula:

$$x = \frac{y^2/r}{1 + \sqrt{1 - p(y/r)^2}} + \Sigma A_{2i} y^{2i}$$

wherein the reference symbol p represents the conic constant and the reference symbol $A_{2i}$ designates the coefficient of aspherical surface of the 2i order.

For arranging these aspherical surfaces, it is desirable to select a location which permits correcting distortion with influence as little as possible on the curvature of field. For this reason, it is desirable to select a location which is as far as possible from the aperture stop and at which the offaxial principal ray is high.

Further, the Embodiments 15 through 21 comprise a cemented or single-element plano-convex lens component having a convex surface on the image side and arranged before the aperture stop.

In these Embodiments, the front lens unit has very strong refractive power for obtaining a super-wide angle of view, and produces negative distortion and positive curvature of field accordingly. Therefore, distortion and curvature of field in the objective lens system as a whole are corrected favorably by producing the reverse aberrations by the above-described lens component having a convex surface on the image side. In order to allow the lens component to exhibit the correcting functions sufficiently, it is preferable to arrange the above-described lens component having a convex surface on the image side at a location at which ray is high. This lens component corresponds to the lens component having $r_7$ through $r_9$ in the Embodiment 15, 16, 17, 18, 20 and 21 or the lens component having $r_5$ through $r_6$ in the Embodiment 19.

Figure 18:
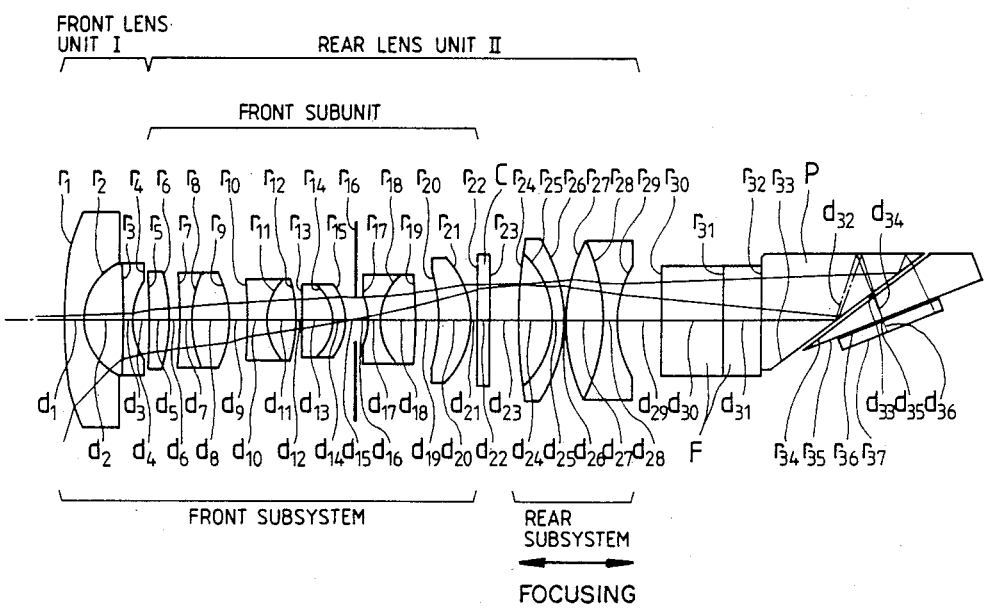
Figure 19:
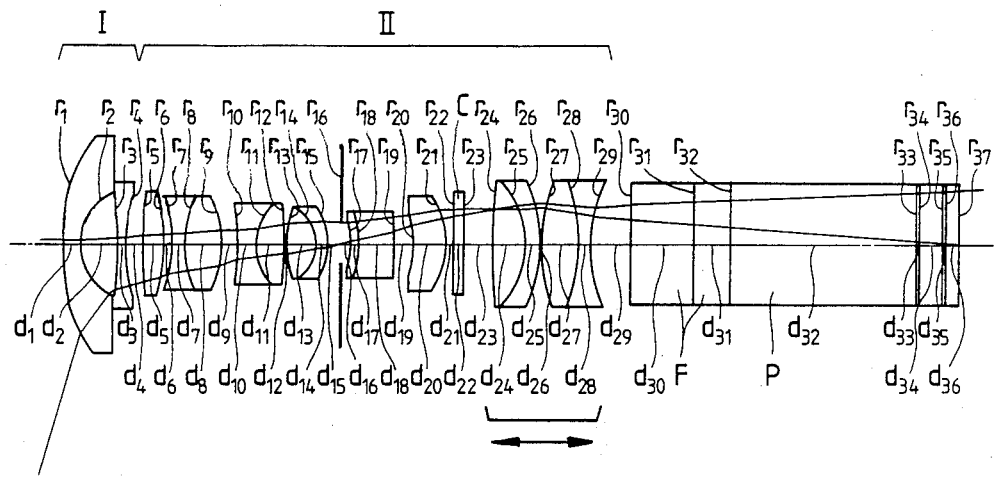
Figure 20:
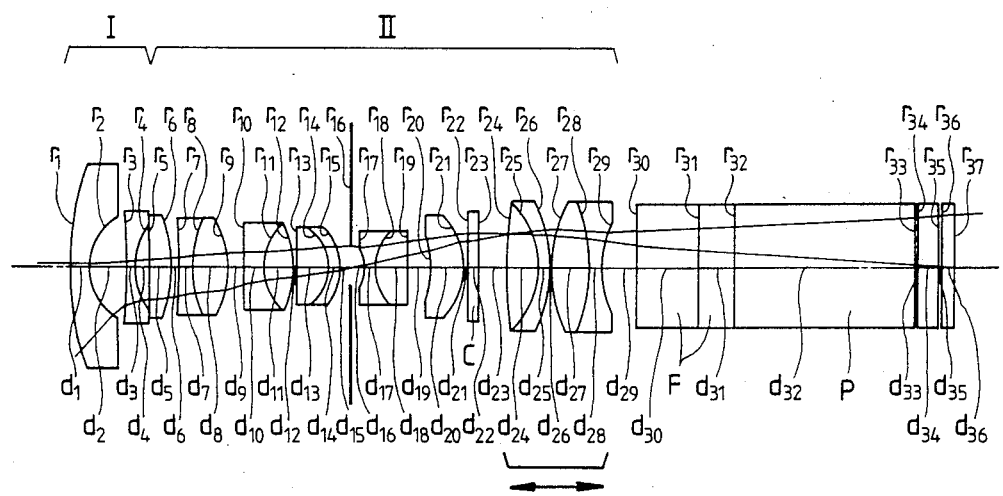
Figure 21:
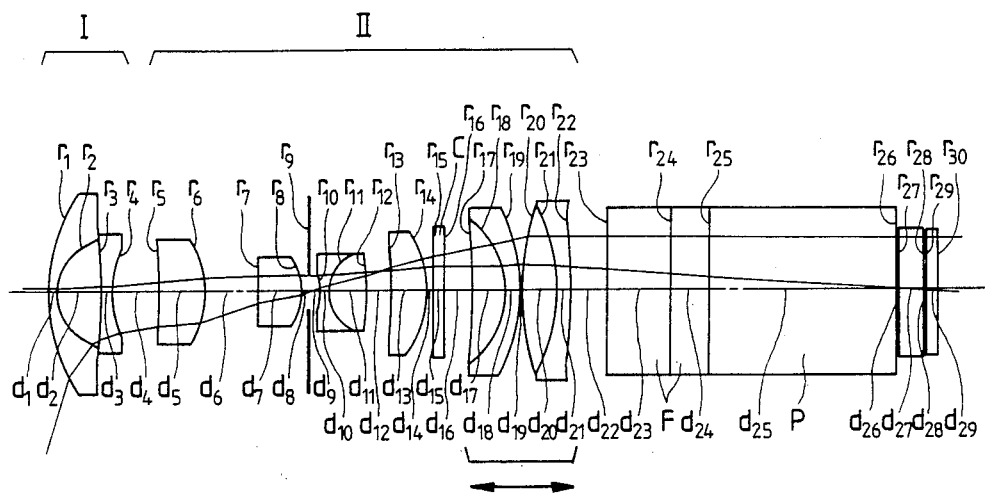
Figure 22:
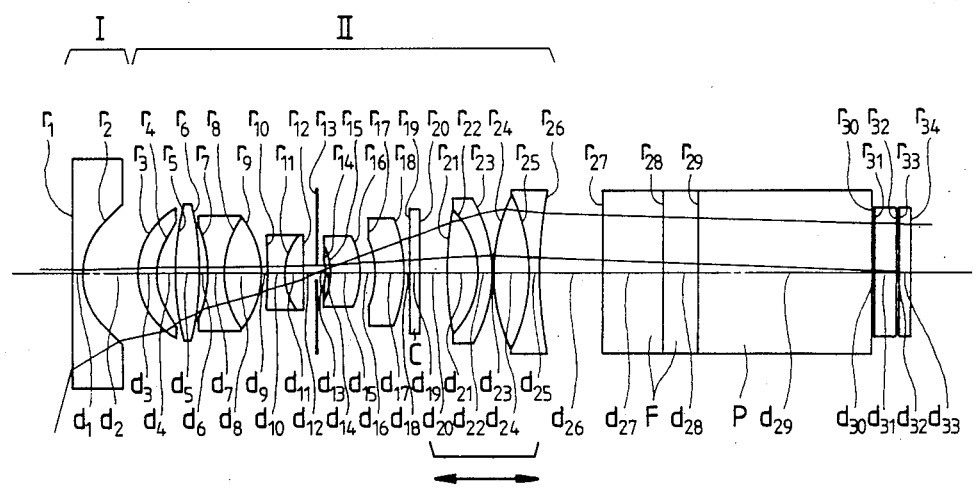
Figure 23:
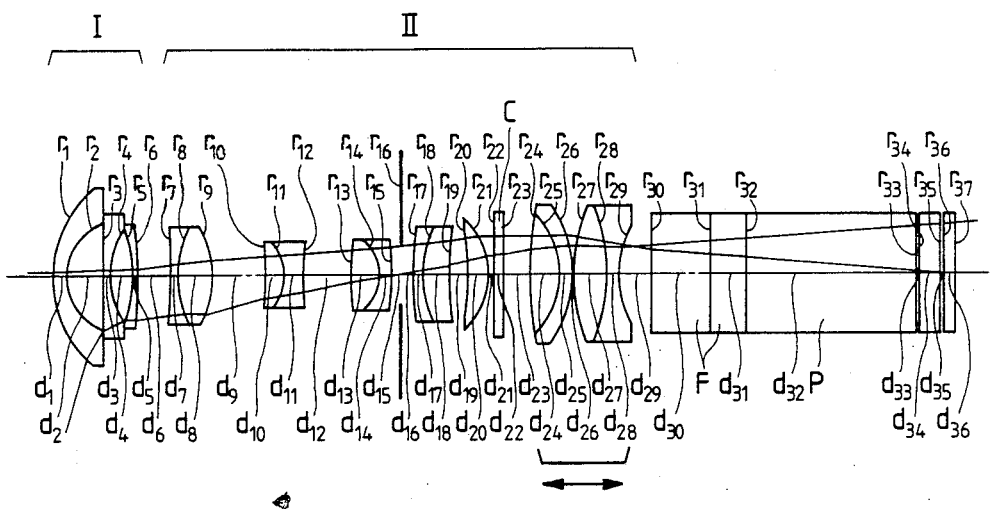
Figure 24:
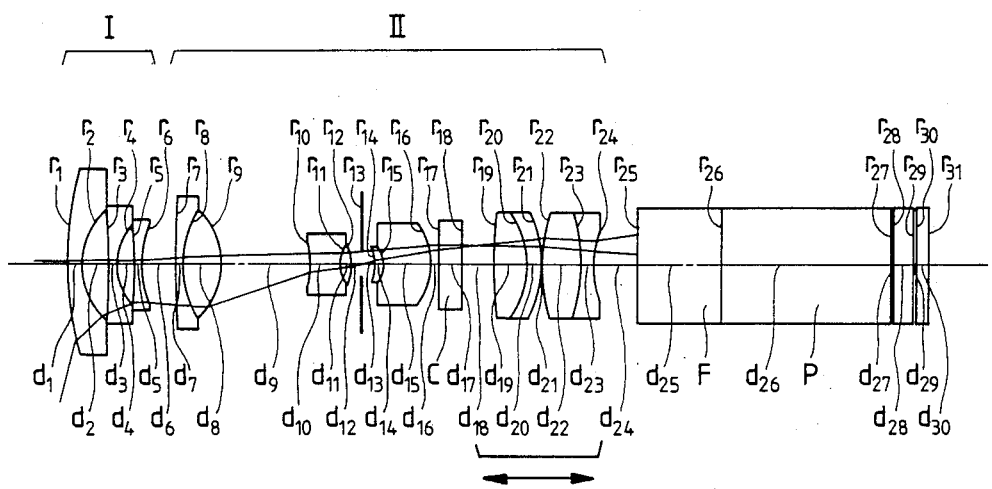

The Embodiment 15 comprises the prisms p as the optical path deflecting system arranged after the objective lens system as shown in FIG. 18. The reference symbol F represents an optical low pass filter and an infrared light cut filter. Similarly, the prisms p are arranged also in the Embodiment 16 through 21.

Further, a plane parallel plate C is arranged in the objective lens system in each of the Embodiments 15 through 21. In the airspace wherein the plane parallel plate C is arranged, the paraxial marginal ray is nearly parallel to the optical axis. Taking this airspace as a boundary, the objective lens system can be divided into a front subsystem and a rear subsystem. It is possible to consider this front subsystem as a front conversion lens and design it as an adapter which can be freely attached and detached to and from the rear subsystem. When such a composition is selected, it is possible to observe an object at a relatively narrow field angle only through the rear subsystem arranged after the plane parallel plate C with the front subsystem detached. It is also possible to observe an object at a very wide field angle with the front subsystem attached to the rear subsystem. A single objective lens system is usable for observation in two different ways at different field angles and described above. This composition remarkably widens range of application and provides high convenience. Especially when a multiple number of front subsystems having different field angles, etc. are prepared as adapters, it is possible to observe all types of objects in optimum conditions with a single endoscope.

Figure 26:
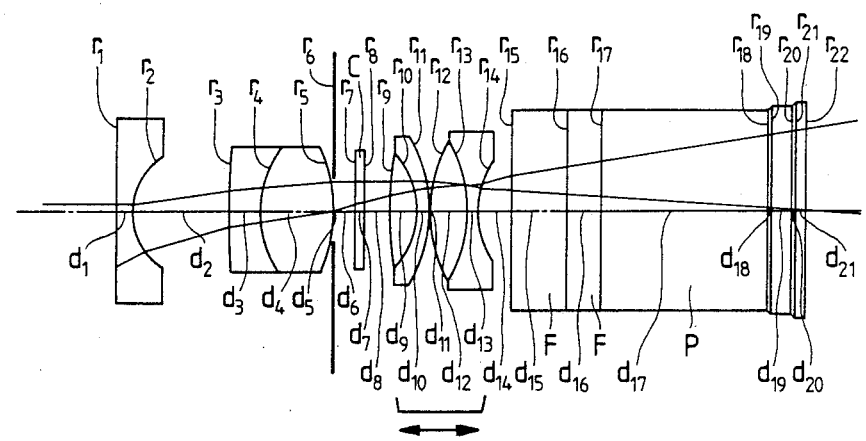
FIG. 26 shows a sectional view illustrating another Embodiment of the present invention wherein the objective lens system is designed as an adapter.

FIG. 26 shows another adapter having the following numerical data:

| f = 1, F/5.0, 2ω = 120° | | | |
|---|---|---|---|
| $r_1 = \infty$ | | | |
| | $d_1 = 0.1839$ | $n_1 = 1.88300$ | $\nu_1 = 40.78$ |
| $r_2 = 0.7822$ | | | |
| | $d_2 = 1.1873$ | | |
| $r_3 = 11.7683$ | | | |
| | $d_3 = 0.3704$ | $n_2 = 1.78590$ | $\nu_2 = 44.18$ |
| $r_4 = 1.2750$ | | | |
| | $d_4 = 0.9194$ | $n_3 = 1.64769$ | $\nu_3 = 33.80$ |
| $r_5 = -1.6110$ | | | |
| | $d_5 = 0.0000$ | | |
| $r_6 = \infty$ (stop) | | | |
| | $d_6 = 0.2443$ | | |
| $r_7 = \infty$ | | | |

-continued

| f = 1, F/5.0, 2ω = 120° | | | |
|---|---|---|---|
| | $d_7 = 0.1313$ | $n_4 = 1.51633$ | $\nu_4 = 64.15$ |
| $r_8 = \infty$ | | | |
| | $d_8 = 0.3152$ | | |
| $r_9 = 4.0305$ | | | |
| | $d_9 = 0.3677$ | $n_5 = 1.53256$ | $\nu_5 = 45.91$ |
| $r_{10} = -0.9430$ | | | |
| | $d_{10} = 0.1313$ | $n_6 = 1.84666$ | $\nu_6 = 23.78$ |
| $r_{11} = -1.5808$ | | | |
| | $d_{11} = 0.0263$ | | |
| $r_{12} = 1.8529$ | | | |
| | $d_{12} = 0.4150$ | $n_7 = 1.72916$ | $\nu_7 = 54.68$ |
| $r_{13} = -1.8529$ | | | |
| | $d_{13} = 0.1313$ | $n_8 = 1.72825$ | $\nu_8 = 28.46$ |
| $r_{14} = 1.2774$ | | | |
| | $d_{14} = 0.3888$ | | |
| $r_{15} = \infty$ | | | |
| | $d_{15} = 0.6751$ | $n_9 = 1.54869$ | $\nu_9 = 45.55$ |
| $r_{16} = \infty$ | | | |
| | $d_{16} = 0.3940$ | $n_{10} = 1.51633$ | $\nu_{10} = 64.15$ |
| $r_{17} = \infty$ | | | |
| | $d_{17} = 2.0273$ | $n_{11} = 1.69500$ | $\nu_{11} = 42.16$ |
| $r_{18} = \infty$ | | | |
| | $d_{18} = 0.0005$ | | |
| $r_{19} = \infty$ | | | |
| | $d_{19} = 0.2842$ | $n_{12} = 1.69500$ | $\nu_{12} = 42.16$ |
| $r_{20} = \infty$ | | | |
| | $d_{20} = 0.0004$ | | |
| $r_{21} = \infty$ | | | |
| | $d_{21} = 0.1313$ | $n_{13} = 1.51633$ | $\nu_{13} = 64.15$ |
| $r_{22} = \infty$ | | | |

In the above-mentioned example, a rear subsystem which is the same as that used in the Embodiment 15 is arranged after the plane parallel plate C. However, the numerical data of the rear subsystem is multiplied by a coefficient. Accordingly, the front subsystem arranged before the plane parallel plate C in the Embodiment 15 is replaced with the adapter in the objective lens system having the above-described numerical data. The objective lens system having the numerical data has a field angle of 120° which is rather narrow, but provides an image of an object located in front of the objective lens system at a magnification level higher than that available with the Embodiment 15. An endoscope comprising such a lens system is suited for inspections of interiors of aircraft engines, etc. Further, when a side view prism is prepared as an adapter, it is possible to confirm a location of a flaw on an inside wall of a tube through a super-wide angle optical system and then observe an enlarged image of the flaw by replacing the optical system with the adapter. Observation modes can be remarkably diversified by preparing various types of adapters.

When the various types of adapters described above are to be used selectively and the aberrations to be produced by the lens systems comprised in the individual adapters are variable, image quality will undesirably be varied each time an adapter is replaced with another. It is therefore desirable to preliminarily correct aberrations to predetermined levels in the individual lens systems independently.

In view of the above-described facts, it is desirable, for using the front subsystems arranged before the plane parallel plates as adapter lenses, to design the Embodiments 15 through 21 so as to have the compositions described below.

First, it is desirable to arrange an aperture stop in the front subsystem disposed before the plane parallel plate C. This is because the offaxial aberrations produced by the lens components arranged before the stop are corrected by the lens components arranged after the stop in a super-wide angle lens system. Accordingly, it is possible to correct the offaxial aberrations independently in the front subsystem by arranging a stop in the front subsystem. In this case, it is effective, for correction of spherical aberration and astigmatism, to arrange a meniscus lens component having a convex surface on the image side at a location between the aperture stop and the plane parallel plate. Further, arrangement of a negative lens component between the aperture stop and the plane parallel plate moderates the asymmetrical arrangement of the lens components with regard to the stop and is advantageous for correction of coma. Furthermore, this composition is desirable also for preventing enlargement of the outside diameters of the lens components, especially the lens component arranged close to the object point.

Moreover, it is desirable that the front subunit (for example, $r_5$ through $r_{21}$ in the Embodiment 15 shown in FIG. 18) which is arranged before the plane parallel plate C and in the rear lens unit II is so designed as to have a focal length $f_{A2}$ satisfying the following condition (14):

$$2 \leq f_{A2}/|f_1| \qquad (14)$$

The ratio $f_{A2}/|f_1|$ is the angular magnification of the front subsystem, and nearly equal to the ratio between the field angle of the rear subsystem arranged after the plane parallel plate C and the field angle of the front subsystem. Accordingly, if the ratio $f_{A2}/|f_1|$ is smaller than 2, it will be necessary to select a large field angle for the rear subsystem in order to obtain super-wide angle of view when the front subsystem is attached thereto. In such a case, the rays will be eclipsed if the outside diameter of the front subsystem is not enlarged. Accordingly, the objective lens system will have a large outside diameter, thereby making it impossible to observe interiors of thin tubes, etc.

In these Embodiments, the rear subsystem arranged after the plane parallel plate C has positive refractive power and a simple composition. Since Petzval's sums have positive values in these cases, it is desirable to design the front subsystem so as to have Petzval's sum $p_A$ satisfying the following condition (15):

$$-1.5 < p_A < 0 \qquad (15)$$

If $p_A$ is smaller than $-1.5$, Petzval's sum of the objective lens system as a whole will be negative and large in absolute value thereof, and the image plane will be curved in the positive direction.

Then, it is desirable to design the rear subsystem so as to have focal length $f_M$ satisfying the following condition (16):

$$f_M > 2f \qquad (16)$$

When the objective lens system is designed as an adapter, the rear subsystem is used also independently. In such a case, $f_M$ must be prolonged so as to prolong back focal length of the rear subsystem so that an image of an object is formed on the solid-state image sensor even when the front subsystem is detached. If $f_M$ is smaller than 2f, the image may be blurred when the front subsystem is detached.

When the rear subsystem arranged after the plane parallel plate C is so designed as to be shiftable along the optical axis in each of the Embodiments described above, it is possible to perform focusing of the objective lens system by shifting the rear subsystem. This focusing function is used not only for focusing the objective lens system in accordance with distance to an object. When the objective lens system described as each of the Embodiments is designed as an adapter and the front subsystems are replaced with one another for observations in different modes, parallelism of the light emitted from front the subsystems is variable. This variation of parallelism can be adjusted by shifting said rear subsystem so as to enable observation of sharp images at all times.

As locations to arrange the above-described aspherical surfaces, it is conceivable to select one, two or all of the surfaces on the extreme object side, the lens surface arranged before the plane parallel plate C and the surface arranged on the extreme image side in the objective lens system.

The Embodiments 15 through 21 which are related to the above-mentioned conditions (14), (15) and (16) have the following numerical data:

| Embodiment | $f_1$ | $f_2$ | $f_M$ | $f_{A2}/|f_{A1}|$ | $P_A$ |
|---|---|---|---|---|---|
| 15 | −0.855 | 5.40 | 8.353 | 8.057 | −0.304 |
| 16 | −1.157 | 4.267 | 6.758 | 11.025 | −0.296 |
| 17 | −0.849 | 5.370 | 82.94 | 8.074 | −0.307 |
| 18 | −1.047 | 8.394 | 5.676 | 6.491 | −0.300 |
| 19 | −1.984 | 4.272 | 5.815 | 5.234 | −0.250 |
| 20 | −1.177 | 6.323 | 9.842 | 9.574 | −0.269 |
| 21 | −0.847 | 7.257 | 8.669 | 8.499 | −0.453 |

Figure 27:
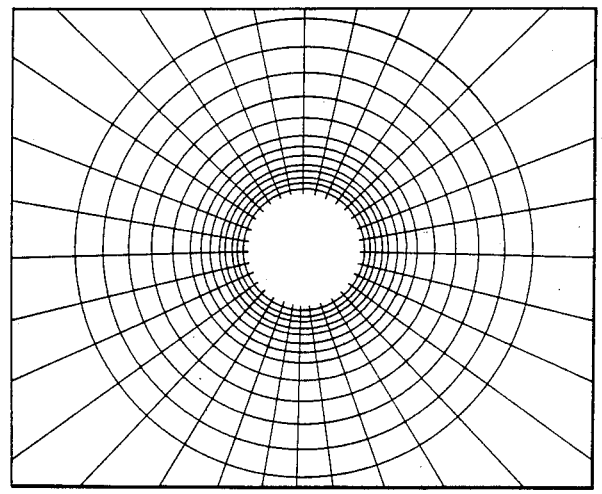
FIG. 27 shows a diagram illustrating an image of a chart sketched on the inside wall of a tube when observed through the image pickup system according to the present invention.
Figure 28:
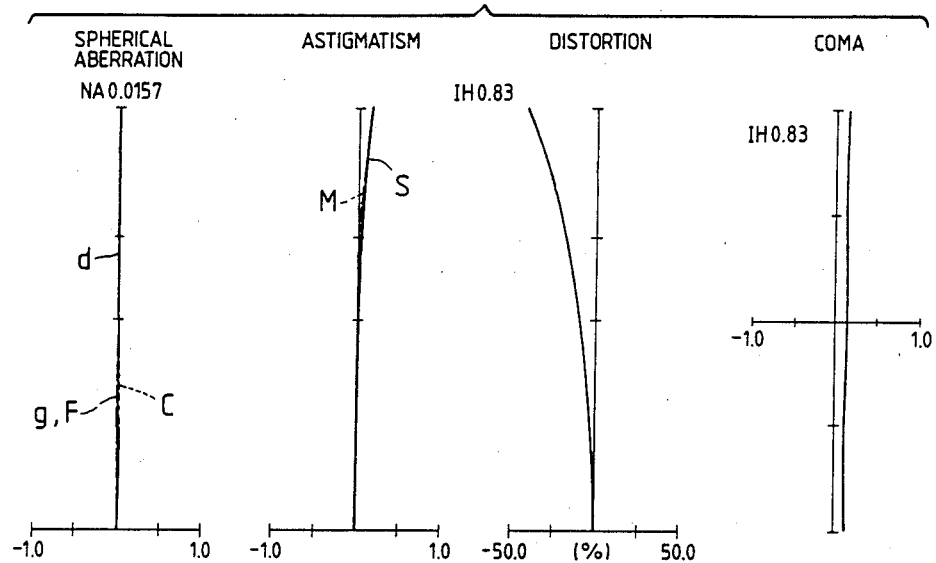
FIG. 28 through FIG. 49 show curves illustrating aberration characteristics of the Embodiments 1 through 21 of the present invention.
Figure 29:
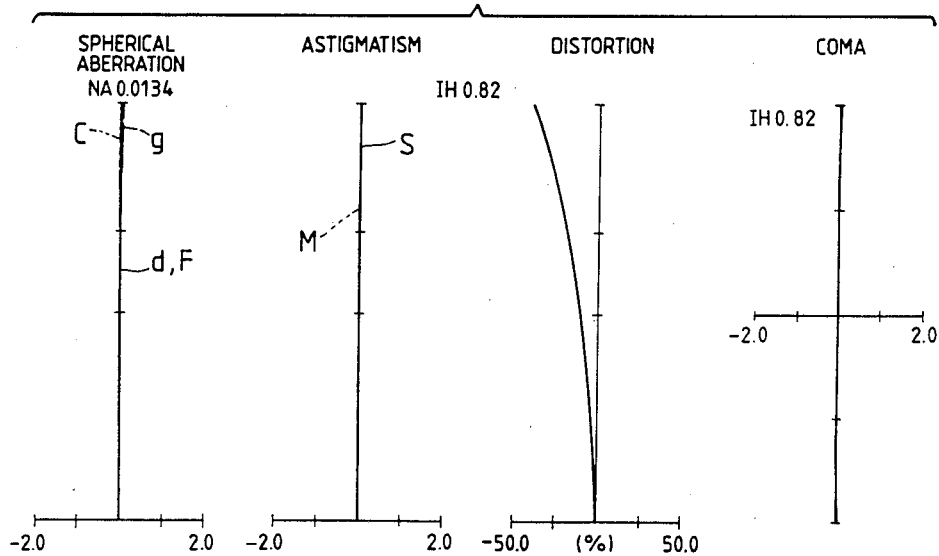
Figure 30:
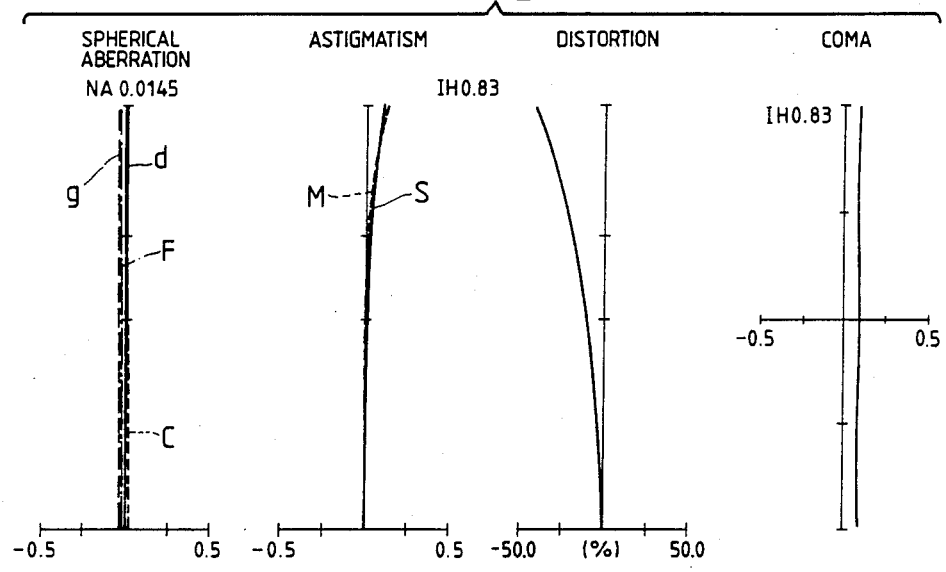
Figure 31:
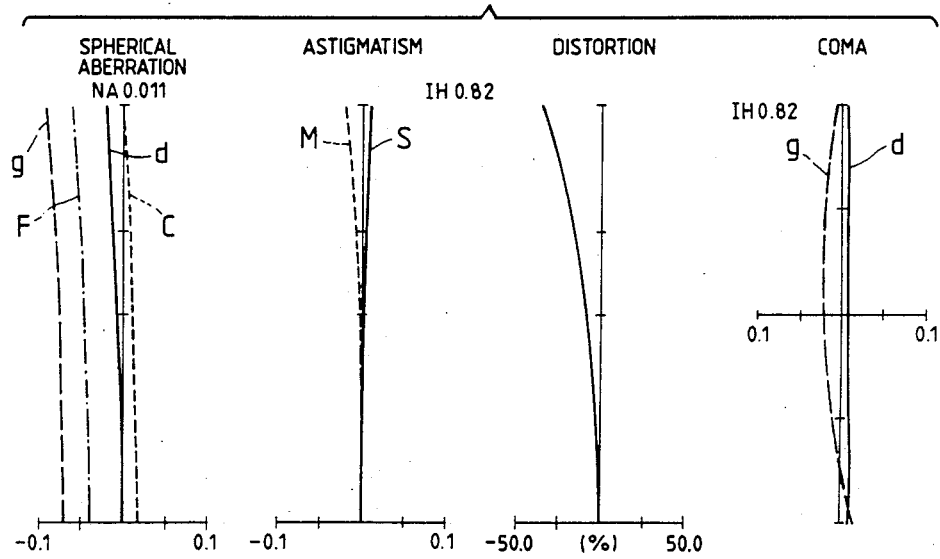
Figure 32:
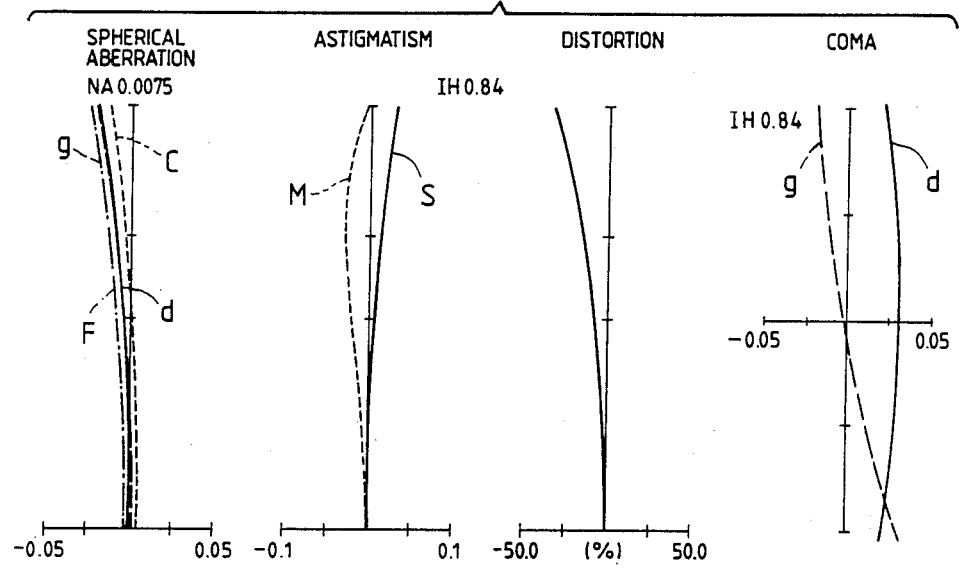
Figure 33:
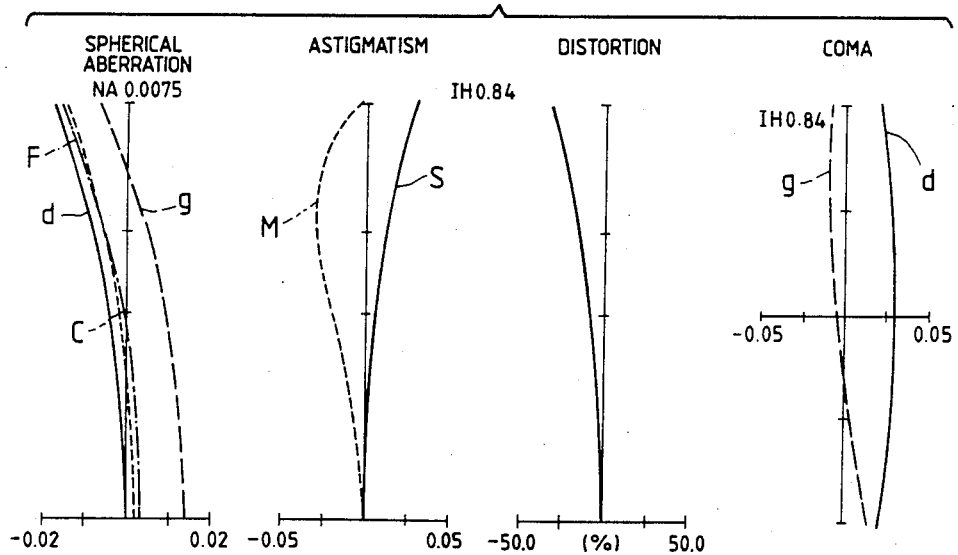
Figure 34:
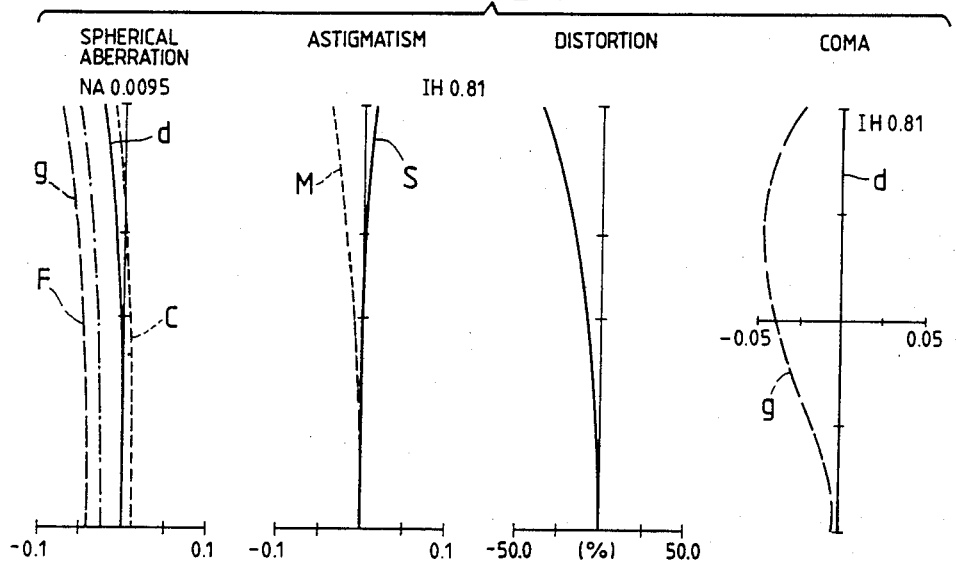
Figure 35:
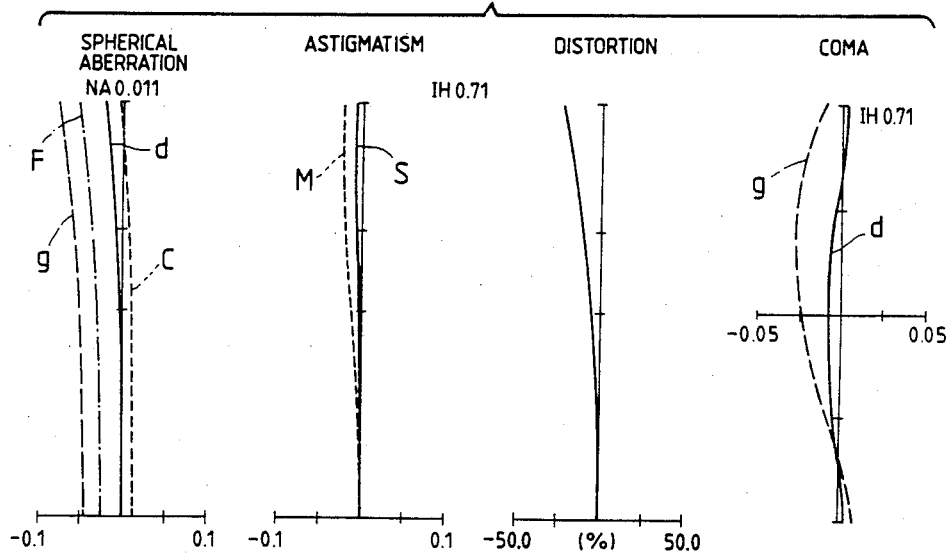
Figure 36:
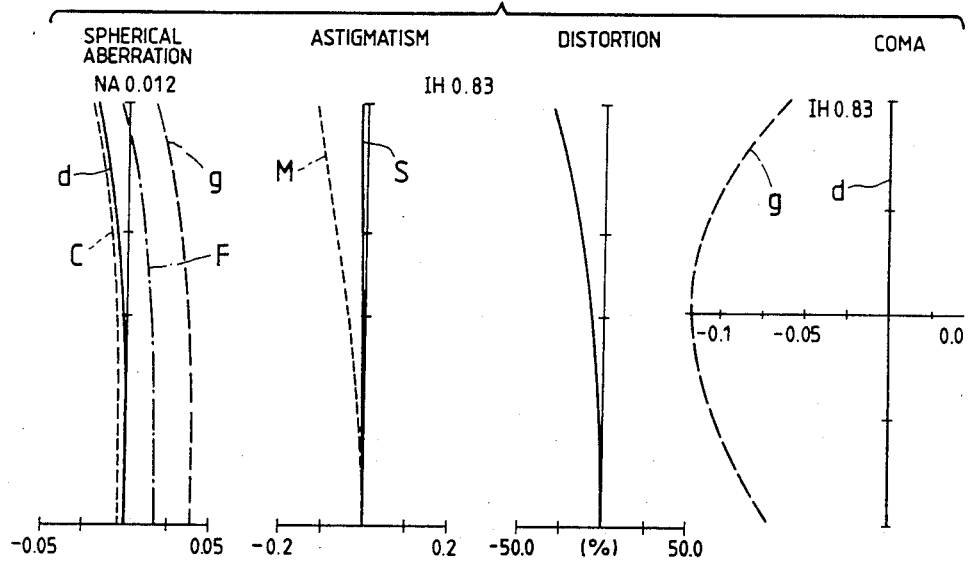
Figure 37:
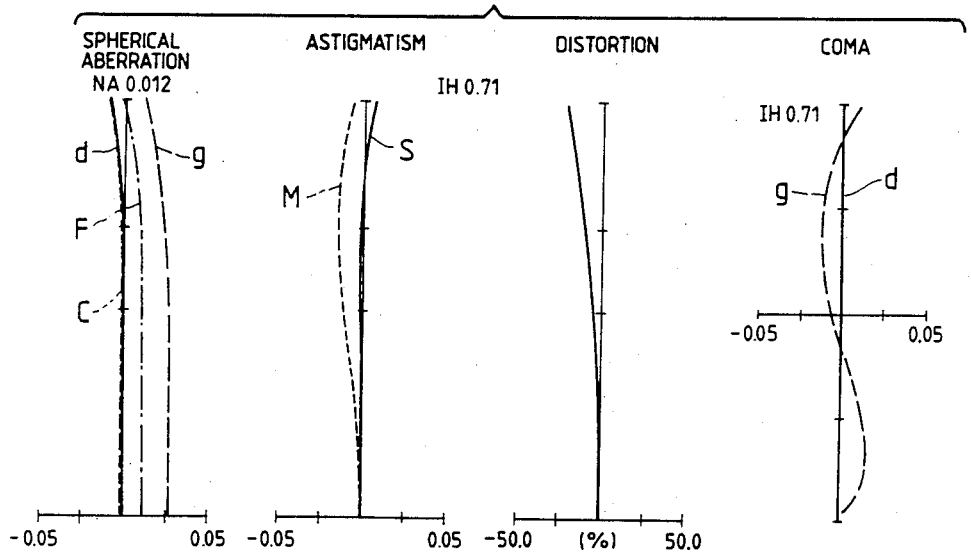
Figure 38:
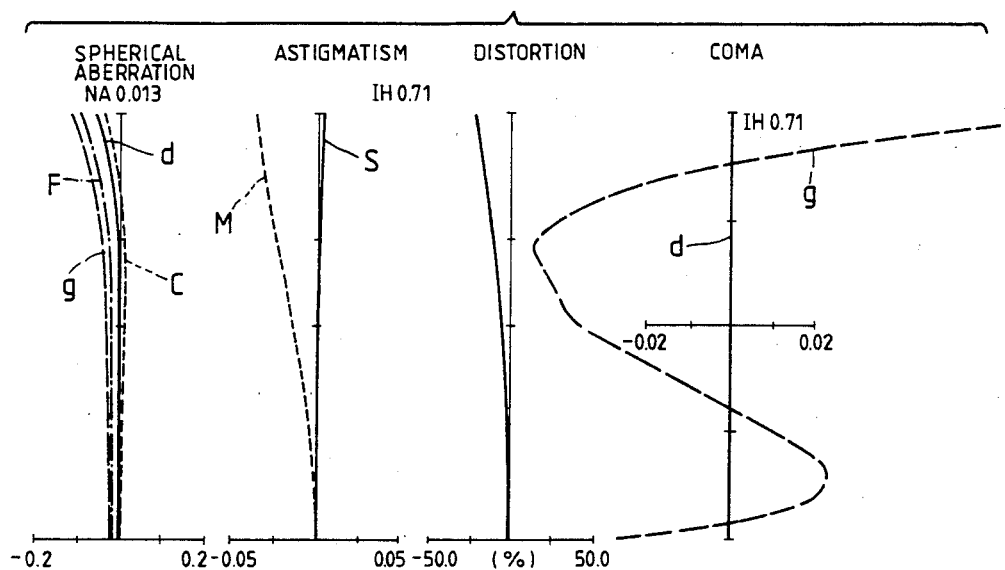
Figure 39:
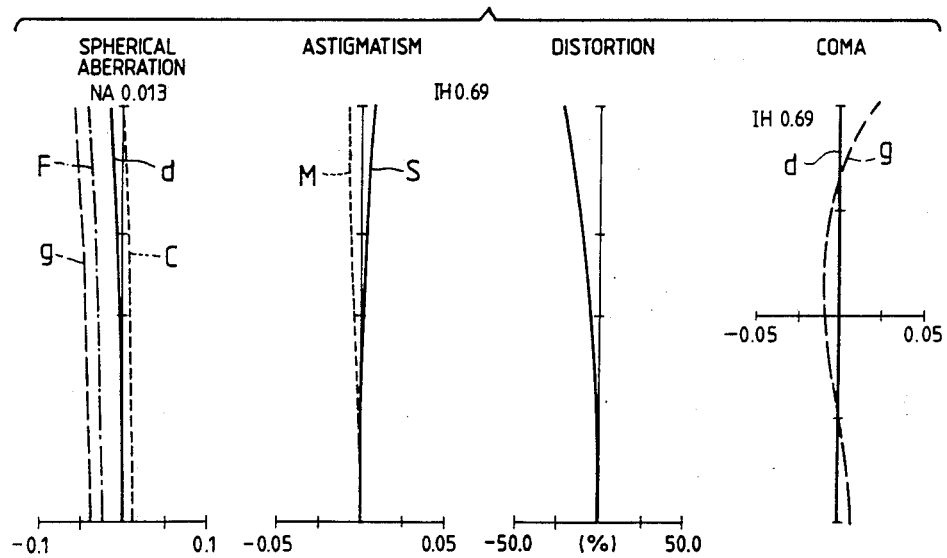
Figure 40:
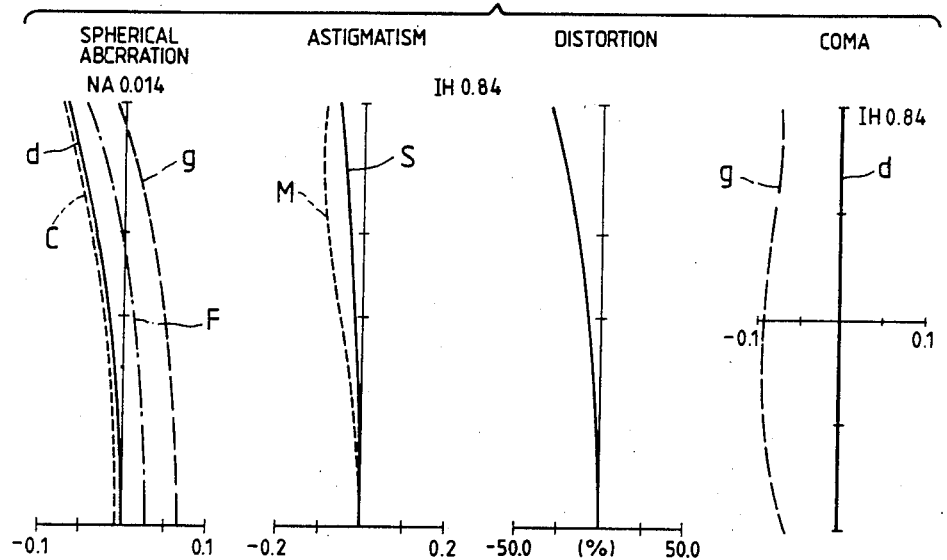
Figure 41:
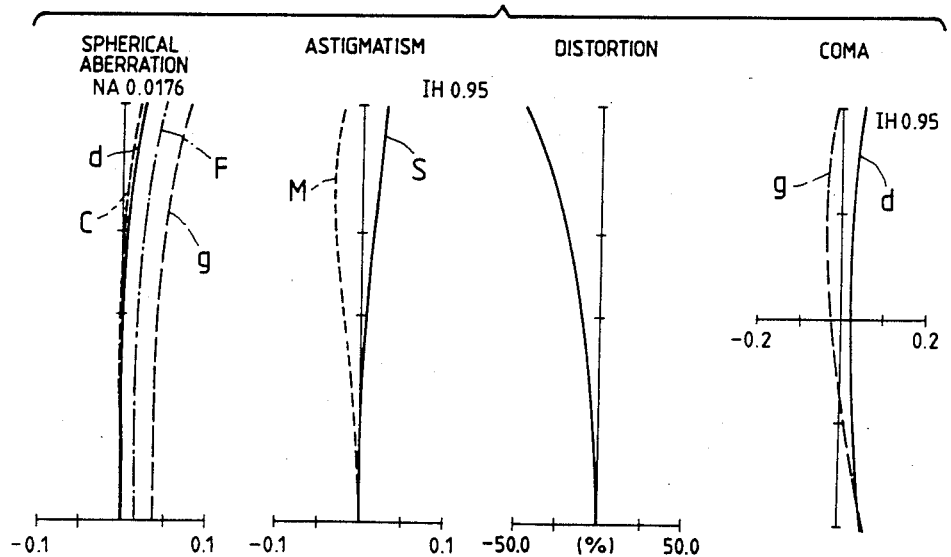
Figure 42:
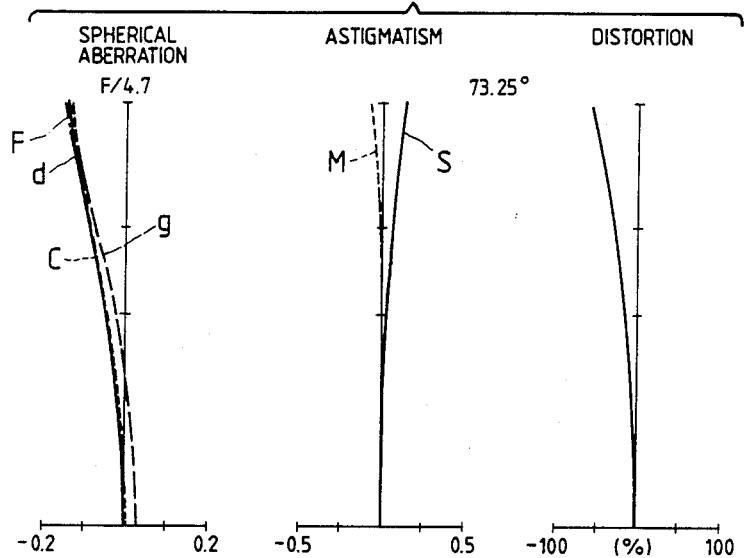
Figure 43:
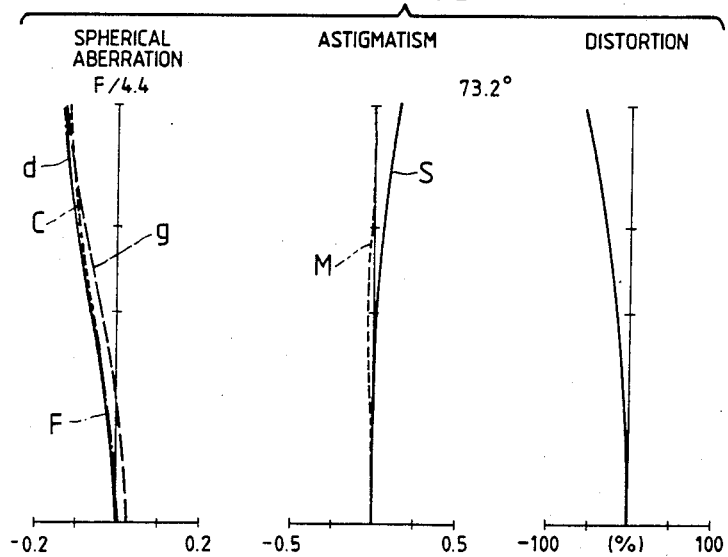
Figure 44:
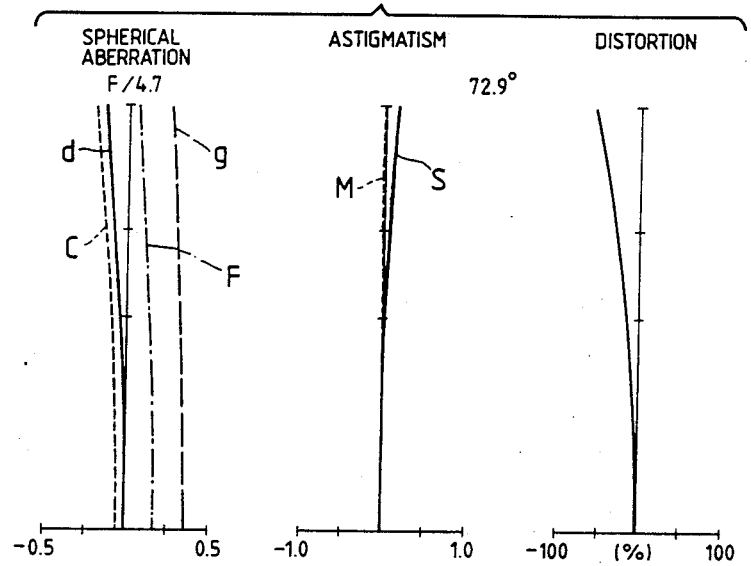
Figure 45:
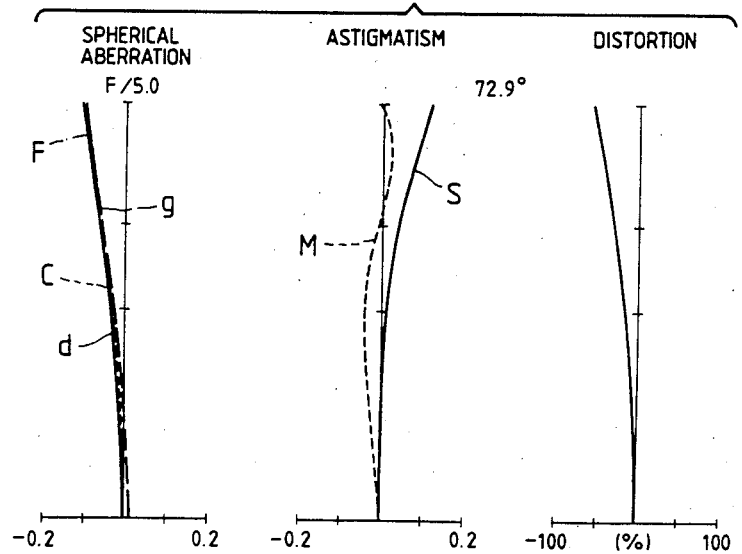
Figure 46:
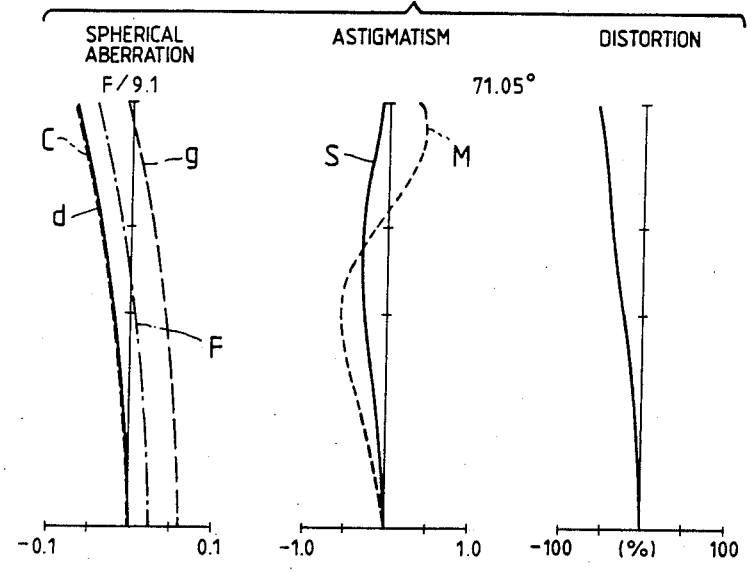
Figure 47:
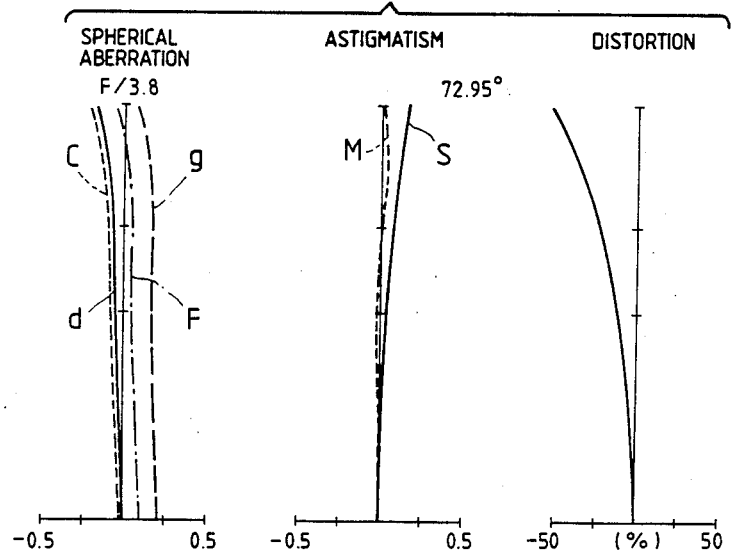
Figure 48:
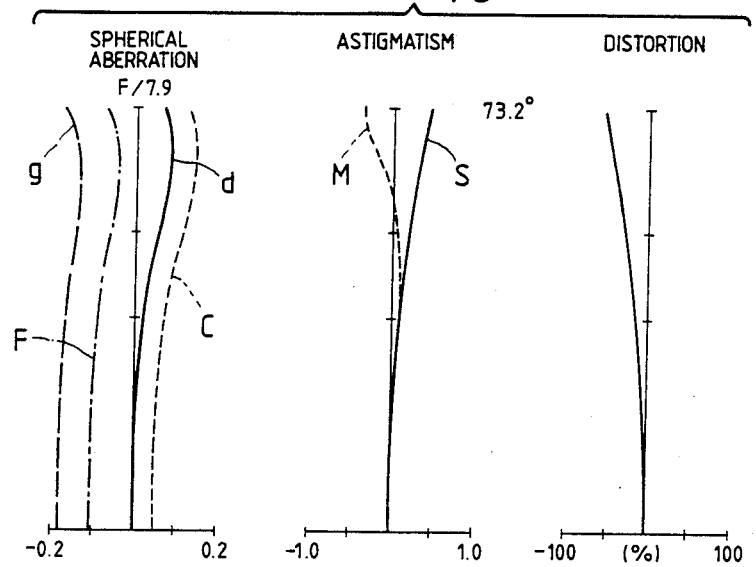
Figure 49:
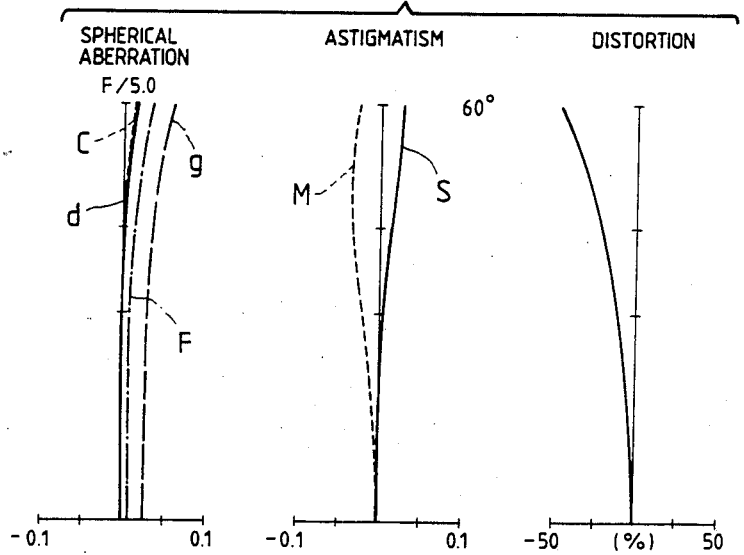

Through the objective lens system for endoscopes described above as each of the Embodiments wherein distortion is corrected especially favorably, interior of a tube is observed as illustrated in FIG. 27. This drawings shows a sketch of an image of a sectioned chart bonded to an inside wall of a tube. As is seen from this drawing, the ratio of lengths is kept almost constant between the radial direction and the circumferential direction of the individual sections, and the inside areas of the tube are reproduced correctly.

Owing to the design for shortening back focal length of the objective lens system, the image pickup system for endoscopes according to the present invention can accommodate an optical path deflecting system and permits arranging an image sensor having relatively wide image forming area obliquely or parallelly relative to the optical axis. Accordingly, the image pickup system for endoscopes according to the present invention makes it possible to obtain thinner endoscopes. Further, the present invention makes it possible to compose endoscopes having multiple functions by dividing the objective lens system into two subsystems one of which is designed as an adapter.

We claim:

1. An objective lens system for endoscopes comprising:
    a front lens unit having negative refractive power,
    a rear lens unit having positive refractive power,
    said objective lens system having a long back focal length and satisfying the following condition (1):

$$|f_1/f| < 3.8 \qquad (1)$$

wherein the reference symbol f, represents focal length of the front lens unit and the reference symbol f designates focal length of the objective lens system as a whole, in combination with an image pick-up system including:
an image sensor arranged obliquely or parallel relative to the optical axis of said objective lens system, and
an optical path deflecting system arranged between said objective lens system and said image sensor,
said image pickup system satisfying the following condition (7):

$$5° \leq \tan^{-1}\frac{I}{SK - EX} \leq 35° \tag{7}$$

wherein the reference symbol I represents height of image, the reference symbol SK designates the distance from the final lens surface of the objective lens system to the image plane determined by the paraxial theory and the reference symbol EX denotes the distance from said final lens surface to the exit pupil.

2. An objective lens system for endoscopes according to claim 1 satisfying the following condition (2):

$$0.4 < f_2/f < 30 \tag{2}$$

wherein the reference symbol $f_2$ represents focal length of the rear lens unit.

3. An objective lens system according to claim 1 or 2 wherein said front lens unit comprises a single negative lens component, said rear lens unit comprises a plural number of lens components including at least one positive cemented doublet consisting of a positive lens element and a negative lens element, and the positive cemented doublet arranged on the extreme object side is so designed as to satisfy the following conditions (9) and (10):

$$n_p > n_n \tag{9}$$

$$\nu_p < \nu_n \tag{10}$$

wherein the reference symbols $n_p$ and $n_n$ represent refractive indices of said positive lens element and said negative lens element respectively, and the reference symbols $\nu_p$ and $\nu_n$ designate Abbe's numbers of said positive lens element and said negative lens element respectively.

4. An image pickup system for endoscopes according to claim 1 or 2 wherein a rectangular aperture stop is arranged before said optical path deflecting system.

5. An image pickup system for endoscopes according to claim 1 or 2 wherein said objective lens system comprises at least one lens component made of quartz.

6. An image pickup system for endoscopes according to claim 1 or 2 comprising an infrared cut filter.

7. An objective lens system for endoscopes comprising:
a front lens unit having negative refractive power,
a rear lens unit having positive refractive power,
said objective lens system having a long back focal length and satisfying the following condition (1):

$$|f_1/f| < 3.8 \tag{1}$$

wherein the reference symbol $f_1$ represents focal length of the front lens unit and the reference symbol f designates focal length of the objective lens system as a whole, and satisfying the following condition (11):

$$|h_1\phi_1| > 1.15|h_4\phi_4| \tag{11}$$

wherein the reference symbol $h_1$ represents average height of the principal ray at the lens component arranged on the extreme object side, the reference symbol $h_4$ designates average height of the principal ray at the lens component arranged on the extreme image side, the reference symbol $\phi_1$ denotes power of the component arranged on the extreme image side and the reference symbol $\phi_4$ represents power of the lens component arranged on the extreme image side.

8. An objective lens system for endoscopes according to claim 7 satisfying the following condition (12) and (13):

$$0.2 < |R_1|/f < 10 \tag{12}$$

$$0.2 < |R_4|/f < 10 \tag{13}$$

wherein the reference symbol $R_1$ represents radius of curvature on the concave surface of the lens component arranged on the extreme object side and the reference symbol $R_4$ designates radius of curvature on the concave surface of the lens Component arranged on the extreme image side.

9. An objective lens system for endoscope comprising:
a front lens unit having negative refractive power, and
a rear lens unit having positive refractive power,
said objective lens system having a long back focal length and satisfying the following condition (1):

$$|f_1/f| < 3.8 \tag{1}$$

wherein the reference symbol $f_1$ represents focal length of the front lens unit and the reference symbol f designates focal length of the objective lens system as a whole, and
also satisfying condition (2):

$$0.4 < f_2/f < 30 \tag{2}$$

wherein the reference symbol $f_2$ represents focal length of the rear lens unit, and
wherein said rear lens unit has an aperture stop and a lens component having an aspherical surface on the object side including portions whose curvature is gradually enhanced as said portions are farther from the optical axis.

10. An objective lens system for endoscopes according to claim 9 comprising, at a location before said aperture stop, a cemented doublet having a convex surface on the image side, and a lens component selected from a single-element plano-convex lens component and a meniscus lens component.

11. An objective lens system for endoscopes comprising:
a front lens unit having negative refractive power
a rear lens unit having positive refractive power,
said objective lens system having a long back focal length and satisfying the following conditions (1) and (2):

$$|f_1/f| < 3.8 \tag{1}$$

wherein the reference symbol $f_1$ represents focal length of the front lens unit and the reference symbol f designates focal length of the objective lens system as a whole, $$0.4 < f_2/f < 30 \tag{2}$$

wherein the reference symbol $f_2$ represents focal length of the rear lens unit, and
wherein said objective lens system has an airspace at which the axial marginal ray becomes nearly parallel to the optical axis and an aperture stop disposed at a location before said airspace.

12. An objective lens system for endoscopes according to claim 11 wherein said rear lens unit consists of a front subunit disposed at a location before said airspace and a rear subunit disposed at a location after said airspace, and satisfies the following condition (14):

$$2 \leq f_{A2}/f_1| \tag{14}$$

wherein the reference symbol $f_{A2}$ represents focal length of the rear subunit.

13. An image pickup system for endoscope according to claim 12 comprising an image sensor arranged obliquely or parallel relative to the optical axis of said objective lens system, and an optical path deflecting system arranged between said objective lens system and said image sensor.

14. An objective lens system for endoscopes comprising:
a front lens unit having negative refractive power, and
a rear lens unit having positive refractive power,
said objective lens system having a long back focal length and satisfying the following condition (1):

$$1f_1|f| < 3.8 \tag{1}$$

wherein the reference symbol $f_1$ represents focal length of the front lens unit and the reference symbol f designates focal length of the objective lens system as a whole, and
also satisfying condition (2):

$$0.4 < f_2/f < 30 \tag{2}$$

wherein the reference symbol $f_2$ represents focal length of the rear lens unit, and
wherein said rear lens unit has an aperture stop therein and a lens component having an aspherical surface on the image side including portions whose curvature is gradually lowered as said portions are farther from the optical axis.

15. An objective lens system for endoscopes according to claim 9 or 14 wherein said objective lens system has an airspace at which the axial marginal ray is nearly parallel to the optical axis and said aperture stop is disposed at a location before said airspace.

16. An objective lens system for endoscopes according to claim 15 wherein said rear lens unit consists of a front subunit disposed at a location before said airspace and a rear subunit disposed at a location after said airspace, and satisfies the following condition (14):

$$2 \leq f_{A2}/|f_1| \tag{14}$$

wherein the reference symbol $f_{A2}$ represents focal length of the rear subunit.

17. An image pickup system for endoscopes according to claim 15 comprising an image sensor arranged one of obliquely and parallel relative to the optical axis of said objective lens system, and an optical path deflecting system arranged between said objective lens system and said image sensor.

18. An objective lens system for endoscopes comprising:
a front lens unit having negative refractive power
a rear lens unit having positive refractive power,
said objective lens system having a long back focal length and satisfying the following condition (1):

$$|f_1/f| < 3.8 \tag{1}$$

wherein the reference symbol $f_1$ represents focal length of the front lens unit and the reference symbol f designates focal length of the objective lens system as a whole,
and satisfying the following conditions (2) and (5):

$$0.4 < f_2/f < 30 \tag{2}$$

wherein the reference symbol $f_2$ represents focal length of the rear lens unit, and $$|f_B/f| > 1.4 \tag{5}$$

wherein the reference symbol $f_B$ represents back focal length of the objective lens system, and
wherein said rear lens unit is equipped with an aperture stop arranged therein and comprises, at a location before said aperture stop, a cemented doublet having a convex surface on the image side, and a lens component selected from a single-element plano-convex lens component and a meniscus lens component,
wherein said objective lens system has an airspace at which the axial marginal ray becomes nearly parallel to the optical axis, and comprises a front subsystem arranged at a location before said airspace and a rear subsystem arranged at a location after said airspace, and satisfies the following condition (15):

$$-1.5 < p_A < 0 \tag{15}$$

wherein the reference symbol $p_A$ represents Petzval's sum of said subsystem.

19. An objective lens system for endoscopes according to claim 18 satisfying the following condition (16):

$$f_M > 2f \tag{16}$$

wherein the reference symbol $f_M$ represents focal length of said rear subsystem.

20. An objective lens system for endoscopes comprising:
a front lens unit having negative refractive power,
a rear lens unit having positive refractive power,
said objective lens system having a long back focal length and satisfying the following condition (1):

$$|f_1/f| < 3.8 \tag{1}$$

wherein the reference symbol $f_1$ represents focal length of the front lens unit and the reference symbol f designates focal length of the objective lens system as a whole, $$0.4 < f_2/f < 30 \quad (2)$$

wherein the reference symbol $f_2$ represents focal length of the rear lens unit, and wherein an aspherical surface is arranged in said front lens unit.

21. An image pickup system for endoscopes according to claim 18, 19 or 20 comprising an image sensor arranged obliquely or parallel relative to the optical axis of said objective lens system, and an optical path deflecting system arranged between said objective lens system and said image sensor.

22. An objective lens system for endoscopes comprising:
a front lens unit having negative refractive power,
a rear lens unit having positive refractive power,
said objective lens system having a long back focal length and satisfying the following condition (1):

$$|f_1/f| < 3.8 \quad (1)$$

wherein the reference symbol $f_1$ represents focal length of the front lens unit and the reference symbol f designates focal length of the objective lens system as a whole, wherein said rear lens unit comprises lens components having positive refractive powers respectively, and a lens component arranged on the extreme image side and having a concave surface kept in contact with air, said objective lens system satisfying the following condition (8):

$$|\theta_1| > |\theta_2/3| \quad (8)$$

wherein the reference symbol $\theta_1$ represents the angle formed between the offaxial principal ray emerging from the objective lens system and the optical axis, and the reference symbol $\theta_2$ designates the angle formed between the offaxial principal ray and the offaxial ray having passed through the marginal portion of a stop.

23. An objective lens system for endoscopes comprising:
a front lens unit having negative refractive power,
a rear lens unit having positive refractive power,
said objective lens system having a long back focal length and satisfying the following condition (1):

$$|f_1/f < 3.8 \quad (1)$$

wherein the reference symbol $f_1$ represents focal length of the front lens unit and the reference symbol f designates focal length of the objective lens system as a whole, and also satisfying the following condition (2):

$$0.4 < f_2/f < 30 \quad (2)$$

wherein the reference symbol $f_2$ represents focal length of the rear lens unit, wherein said rear lens unit comprises lens components having positive refractive powers respectively, and a lens component arranged on the extreme image side and having a concave surface kept in contact with air, said objective lens system satisfying the following condition (8):

$$|\theta_1| > |\theta_2/3| \quad (8)$$

wherein the reference symbol $\theta_1$ represents the angle formed between the offaxial principal ray emerging from the objective lens system and the optical axis, and the reference symbol $\theta_2$ designates the angle formed between the offaxial principal ray and the offaxial ray having passed through the marginal portion of a stop.

24. An objective lens system for endoscopes comprising a front lens unit having negative refractive power and a rear lens unit having positive refractive power, said objective lens system having a long back focal length and satisfying the following conditions (1), (2) and (5):

$$|f_1/f| < 3.8 \quad (1)$$

$$0.4 < f_2/f < 30 \quad (2)$$

$$|f_B/f| > 1.4 \quad (5)$$

wherein the reference symbol f represents focal length of the objective lens system as a whole, the reference symbol $f_1$ designates focal length of the front lens unit, the reference symbol $f_2$ denotes focal length of the rear lens unit and the reference symbol $f_B$ represents back focal length of the objective lens system.

25. An objective lens system for endoscopes according to claim 24 comprising an optical path deflecting system on the image side of said rear lens unit and an aperture stop between said rear lens unit and said optical path deflecting system, said objective lens system satisfying the following conditions (3) and (4):

$$-1.2 < f_1/f < -0.5 \quad (3)$$

$$1.5 < f_2/f < 2.5 \quad (4).$$

26. An objective lens system for endoscopes according to claim 24 comprising an optical path deflecting system on the image side of said rear lens unit and an aperture stop between said rear lens unit and said optical path deflecting system, said objective lens system satisfying the following conditions (6):

$$|f_B/f > 3 \quad (6).$$

27. An image pickup system for endoscopes according to claim 24 comprising an image sensor arranged obliquely or parallelly relative to the optical axis of said objective lens system and an optical path deflecting system arranged between said objective lens system and said image sensor, said image pickup system satisfying the following condition (7):

$$5^\circ \leq \tan^{-1} \frac{I}{SK - EX} \leq 35^\circ \quad (7)$$

wherein the reference symbol I represents height of image, the reference symbol SK designates the distance from the final lens surface of the objective lens system to the image plane determined by the paraxial theory and the reference symbol EX denotes the distance from said final lens surface to the exit pupil.

28. An image pickup system for endoscopes according to claim 27 wherein said rear lens unit comprises lens components having positive refractive powers respectively, and a lens component arranged on the extreme image side and having a concave surface kept in contact with air, said objective lens system satisfying the following condition (8):

$$|\theta_1| > |\theta_2/3| \quad (8)$$

wherein the reference symbol $\theta_1$ represents the angle formed between the offaxial principal ray emerging from the objective lens system and the optical axis, and the reference symbol $\theta_2$ designates the angle formed between the offaxial principal ray and the offaxial ray having passes through the marginal portion of a stop.

29. An image pickup system for endoscopes according to claim 27 wherein a rectangular aperture stop is arranged before said optical path deflecting system.

30. An image pickup system for endoscopes according to claim 27 wherein said objective lens system comprises at least one lens component made of quartz.

31. An image pickup system for endoscopes according to claim 27 comprising an infrared cut filter.

32. An objective lens system for endoscopes according to claim 27 wherein said front lens unit comprises a single negative lens component, said rear lens unit comprises a plural number of lens components including at least one positive cemented doublet consisting of a positive lens element and a negative lens element, and the positive cemented doublet arranged on the extreme object side satisfying the following conditions (9) and (10):

$$n_p > n_n \quad (9)$$

$$\nu_p < \nu_n \quad (10)$$

wherein the reference symbols $n_p$ and $n_n$ represent refractive indices of said positive lens element and said negative lens element respectively, and the reference symbols $\nu_p$ and $\nu_n$ designate Abbe's numbers of said positive lens element and said negative lens element respectively.

33. An objective lens system for endoscope according to claim 24 wherein said rear lens unit comprises lens components having positive refractive powers respectfully, and a lens component arranged on the extreme image side and having a concave surface kept in contact with air, said objective lens system satisfying the following condition (8):

$$|\theta_1| > |\theta_2/3| \quad (8)$$

wherein the reference symbol $\theta_1$ represents the angle formed between the offaxial principal ray emerging from the objective lens system and the optical axis, and the reference symbol $\theta_2$ designates the angle formed between the offaxial principal ray and the offaxial ray having passed through the marginal portion of a stop.

34. An objective lens system for endoscopes according to claim 24 satisfying the following condition (11):

$$|h_1\phi_1| > |1.15|h_4\phi_4| \quad (11)$$

wherein the reference symbol $h_1$ represents average height of the principal ray at the lens component arranged on the extreme object side, the reference symbol $h_4$ designates average height of the principal ray at the lens component arranged on the extreme image side, the reference symbol $\phi_1$ denotes power of the lens component arranged on the extreme image side and the reference symbol $\phi_4$ represents power of the lens component arranged on the extreme image side.

35. An objective lens system for endoscopes according to claim 34 satisfying the following condition (12) and (13):

$$0.2 < |R_1|/f < 10 \quad (12)$$

$$0.2 < |R_4|/f < 10 \quad (13)$$

wherein the reference symbol $R_1$ represents radius of curvature on the concave surface of the lens component arranged on the extreme object side and the reference symbol $R_4$ designates radius of curvature on the concave surface of the lens component arranged on the extreme image side.

36. An objective lens system for endoscopes according to claim 24 wherein said rear lens unit is equipped with an aperture stop arranged therein and a lens component having an aspherical surface on the object side thereof including portions whose curvature is gradually enhanced as said portions are farther from the optical axis.

37. An objective lens system for endoscopes according to claim 24 wherein said rear lens unit is equipped with an aperture stop arranged therein and a lens component having an aspherical surface on the image side thereof including portions whose curvature is gradually lowered as said portions are farther from the optical axis.

38. An objective lens system for endoscopes according to claim 36 or 37 wherein said objective lens system has an airspace at which the axial marginal ray becomes nearly parallel to the optical axis and said aperture stop is arranged at a location before said airspace.

39. An objective lens system for endoscope according to claim 38 wherein said rear lens unit consists of a front subunit arranged at a location before said airspace and a rear subunit arranged at a location after said airspace, and satisfying the following condition (14):

$$2 \leq f_{42}/|f_1| \quad (14)$$

wherein the reference symbol $f_{42}$ represents focal length of the rear subunit.

40. An image pickup system for endoscopes according to claim 39 comprising an image sensor arranged obliquely or parallel relative to the optical axis of said objective lens system, and an optical path deflecting system arranged between said objective lens system and said image sensor.

41. An image pickup system for endoscopes according to claim 38 comprising an image sensor arranged obliquely or parallel relative to the optical axis of said objective lens system, and an optical path deflecting system arranged between said objective lens system and said image sensor.

42. An objective lens system for endoscopes according to claim 36 or 37 comprising, at a location before said aperture stop, a lens component selected from a cemented doublet having a convex surface on the image side, a plano-convex lens component and a meniscus lens component.

43. An objective lens system for endoscopes according to claim 42 wherein said objective lens system has an airspace at which the axial marginal ray becomes nearly parallel to the optical axis, and comprises a front subsystem arranged at a location before said airspace and a rear subsystem arranged at a location after said airspace, and satisfying the following condition (15):

$$-1.5 p_A < 0 \tag{15}$$

wherein the reference symbol $p_A$ represents Petzval's sum of said subsystem.

44. An image pickup system for endoscopes according to claim 43 comprising an image sensor arranged obliquely or parallel relative to the optical axis of said objective lens system, and an optical path deflecting system arranged between said objective lens system and said image sensor.

45. An objective lens system for endoscopes according to claim 43 satisfying the following condition (16):

$$f_M > 2f \tag{16}$$

wherein the reference symbol $f_M$ represents focal length of said rear subsystem.

46. An objective lens system for endoscopes according to claim 24 wherein said rear lens unit is equipped with an aperture stop arranged therein and comprises, at a location before said aperture stop, a lens component selected from a cemented doublet having a convex surface on the image side, a plano-convex lens component and a meniscus lens component.

47. An objective lens system for endoscopes according to claim 24 wherein said objective lens system has an airspace at which the axial marginal ray becomes nearly parallel to the optical axis and an aperture stop is arranged at a location before said airspace.

48. An image pickup system for endoscopes according to claim 47 comprising an image sensor arranged obliquely or parallel relative to the optical axis of said objective lens system, and an optical path deflecting system arranged between said objective lens system and said image sensor.

49. An objective lens system for endoscopes according to claim 46 or 47 wherein said rear lens unit consists of a front subunit arranged at a location before said airspace and a rear subunit arranged at a location after said airspace, and satisfying the following condition (14):

$$2 \leq f_{A2}/|f_1| \tag{14}$$

wherein the reference symbol $f_{A2}$ represents focal length of the rear subunit.

50. An image pickup system for endoscopes according to claim 49 comprising an image sensor arranged obliquely or parallel relative to the optical axis of said objective lens system, and an optical path deflecting system arranged between said objective lens system and said image sensor.

51. An objective lens system for endoscopes according to claim 24 wherein an aspherical surface is arranged in said front lens unit.

* * * * *